United States Patent
Marinakis et al.

(10) Patent No.: US 12,440,422 B2
(45) Date of Patent: Oct. 14, 2025

(54) DEVICES, SYSTEMS AND METHODS FOR AURICULAR ACUPUNCTURE

(71) Applicant: ADAPTOGENICS TECHNOLOGIES, LLC, Annapolis, MD (US)

(72) Inventors: Peter G. Marinakis, Edgewater, MD (US); Paul Jorgensen, Annapolis, MD (US)

(73) Assignee: ADAPTOGENICS TECHNOLOGIES, LLC, Annapolis, MD (US)

(*) Notice: Subject to any disclaimer, the term of this patent is extended or adjusted under 35 U.S.C. 154(b) by 859 days.

(21) Appl. No.: 17/058,256

(22) PCT Filed: May 30, 2019

(86) PCT No.: PCT/US2019/034568
§ 371 (c)(1),
(2) Date: Nov. 24, 2020

(87) PCT Pub. No.: WO2019/232157
PCT Pub. Date: Dec. 5, 2019

(65) Prior Publication Data
US 2021/0196565 A1    Jul. 1, 2021

Related U.S. Application Data

(60) Provisional application No. 62/678,682, filed on May 31, 2018.

(51) Int. Cl.
*A61H 39/00*    (2006.01)
*A61H 39/08*    (2006.01)

(52) U.S. Cl.
CPC ......... *A61H 39/002* (2013.01); *A61H 39/086* (2013.01); *A61H 2201/1207* (2013.01); *A61H 2201/5048* (2013.01); *A61H 2201/5082* (2013.01); *A61H 2201/5097* (2013.01); *A61H 2205/027* (2013.01); *A61H 2230/06* (2013.01);
(Continued)

(58) Field of Classification Search
None
See application file for complete search history.

(56) References Cited

U.S. PATENT DOCUMENTS 9,517,356 B2    12/2016  Nabat et al.
10,130,809 B2 *  11/2018  Cartledge ............... A61N 1/18
(Continued)

OTHER PUBLICATIONS

He, et al., "Auricular Acupuncture and Vagal Regulation", Evidence-Based Complementary and Alternative Medicine vol. 2012, Article ID 786839. (Year: 2012).*
(Continued)

*Primary Examiner* — Erica S Lee
(74) *Attorney, Agent, or Firm* — MEDLER FERRO WOODHOUSE & MILLS PLLC

(57) ABSTRACT

The present application relates to devices, systems and methods for auricular acupuncture. The devices suitably include an ear retention device that substantially contacts a patient's auricular surface, so as to allow sufficient energy from an optical or electric source to stimulate auricular acupuncture sites. The devices and systems are useful in various methods of treatment of patient conditions and presenting symptoms.

17 Claims, 19 Drawing Sheets

(52) U.S. Cl.
CPC .... *A61H 2230/08* (2013.01); *A61H 2230/505* (2013.01)

(56) References Cited

U.S. PATENT DOCUMENTS

| | | | |
|---|---|---|---|
| 2005/0137656 A1* | 6/2005 | Malak | A61N 5/0616 607/88 |
| 2011/0160811 A1 | 6/2011 | Walker | |
| 2012/0053648 A1* | 3/2012 | Neher | A61N 5/0619 607/58 |
| 2013/0331640 A1* | 12/2013 | Nabat | A61N 5/0619 607/91 |
| 2015/0112405 A1 | 4/2015 | Brown et al. | |
| 2016/0193464 A1* | 7/2016 | Nirenberg | A61N 5/0622 607/48 |
| 2016/0287898 A1* | 10/2016 | Smith | A61N 5/0618 |
| 2017/0042760 A1 | 2/2017 | Hamilton | |
| 2017/0154867 A1* | 6/2017 | Sriram | H01L 24/83 |
| 2017/0246081 A1* | 8/2017 | Brown | A61N 1/36135 |
| 2017/0361094 A1* | 12/2017 | Cartledge | A61N 1/0456 |
| 2018/0021564 A1* | 1/2018 | Goodall | A61N 2/002 600/379 |
| 2018/0280721 A1* | 10/2018 | Beckner | A61B 5/0532 |
| 2019/0029540 A1* | 1/2019 | Negishi | A61B 5/14546 |
| 2019/0388693 A1* | 12/2019 | McDermott | G05B 13/00 |

OTHER PUBLICATIONS

Litscher et al., "Gender Differences in Laser Acupuncture-Results of a Crossover Study with Green and Yellow Laser at the Ear Point Shenmen," Medicines 2018, 5, 24; Publication [online]. Mar. 15, 2018 [retrieved Sep. 18, 2019]. Retrieved from the Internet: <URL:https://www.mdpi.com/2305-6320/5/124> <DOI: 10.3390/medicines5010024>; pp. 1-3.

International Search Report issued Oct. 29, 2019, in International Appln No. PCT/US19/34568.

* cited by examiner

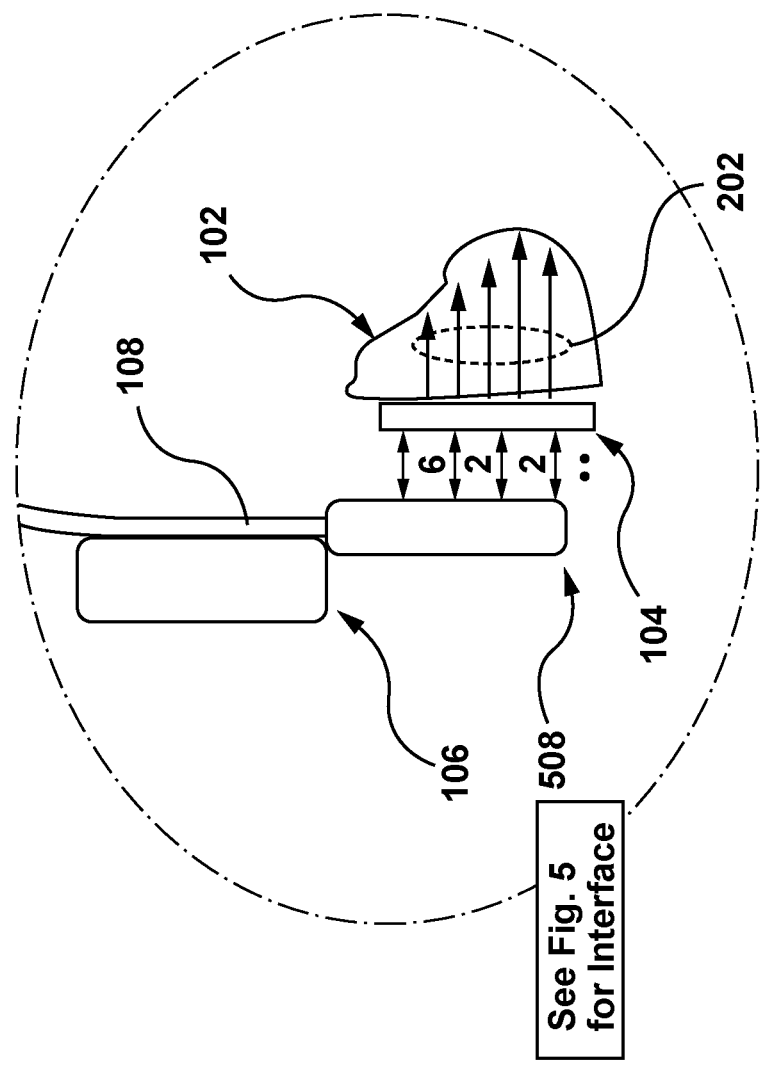
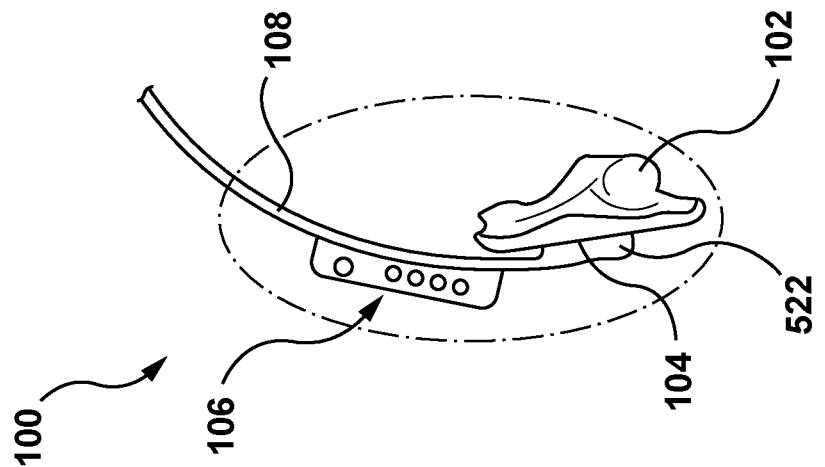
FIG. 2B
FIG. 2A

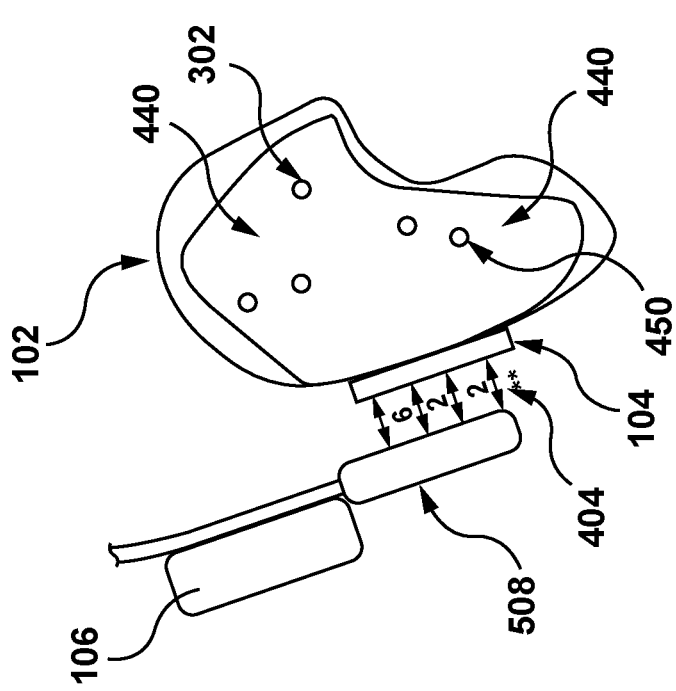
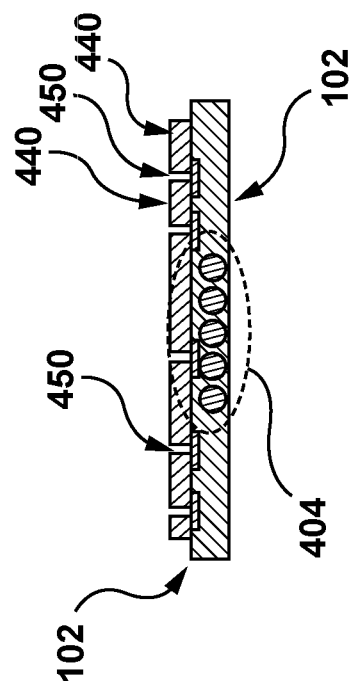
FIG. 4E
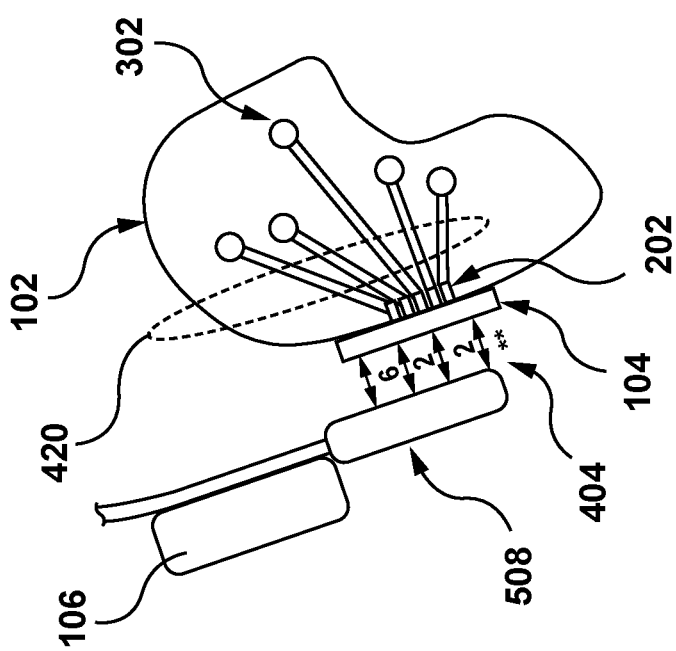
FIG. 4D

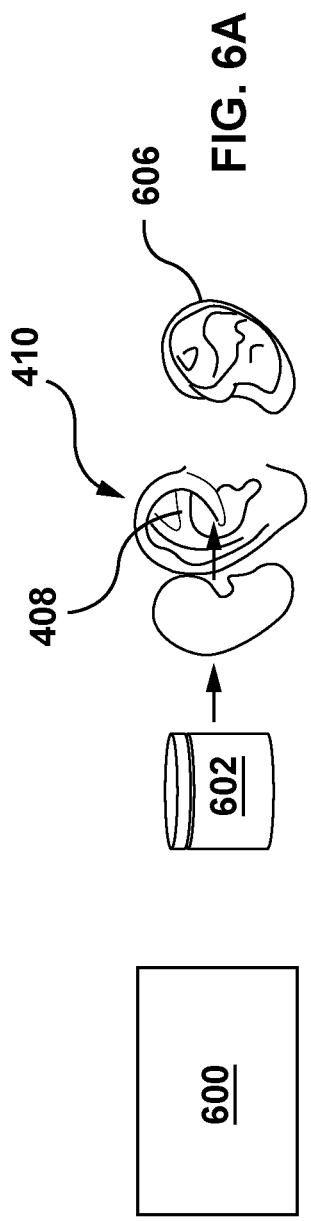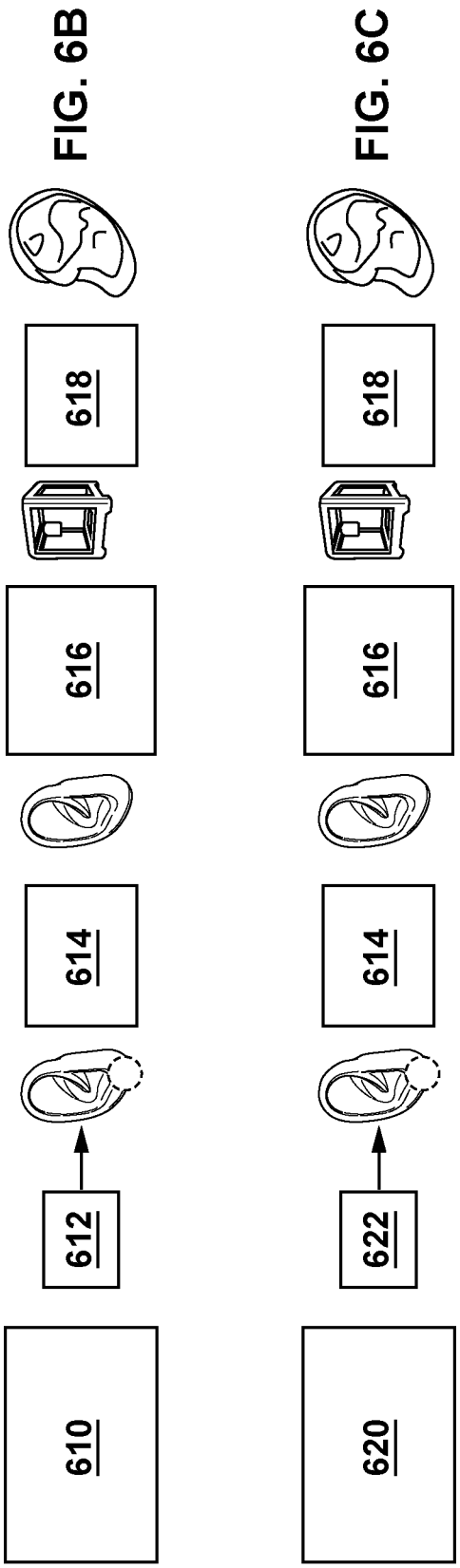

DEVICES, SYSTEMS AND METHODS FOR AURICULAR ACUPUNCTURE

CROSS-REFERENCE TO RELATED APPLICATIONS

The present application is a U.S. National Phase of PCT/US2019/034568, filed May 30, 2019, which claims benefit of U.S. Provisional Patent Application No. 62/678,682, filed May 31, the disclosures of each of which are incorporated by reference herein in their entireties.

FIELD OF THE INVENTION

The present application relates to devices, systems and methods for auricular acupuncture. The devices suitably include an ear retention device that substantially contacts a patient's auricular surface, so as to allow sufficient energy from an optical or electric source to stimulate auricular acupuncture sites. The devices and systems are useful in various methods of treatment of patient conditions and presenting symptoms. Suitably, the systems have an inherent ability to communicate both locally and to a remote database with machine learning capability. The systems can also communicate with local wearable sensors, including wearable devices that record heart rate, body temperature, heart EKG signals, brain wave sensors, etc. When combined with a voice feedback system, remote and voice characterization enables the system to provide a whole person treatment both physically and physiologically to enhance the treatment of Addiction, PTSD, pain and other related human conditions which can be treated using the stimulation of acupuncture points.

BACKGROUND OF THE INVENTION

In Chinese medical science, needle-based acupuncture is one of the therapies commonly used for curing various diseases and for treatment of conditions which affect pain, Post Traumatic Stress Disorder (PTSD) and opioid addiction as well as other similar conditions which are proven to be mitigated through auricular acupuncture points and acupuncture treatments.

However, only practitioners who have undergone special training for acupuncture may administer this therapy. Also, where acupuncture treatment is prescribed for treatment of these conditions, it is also necessary that treatments be performed frequently, including multiple times per day or daily. Such requirements make traditional methods of administering these treatments impractical, expensive or both, for these treatment to be effective. The development of an automated method for administering these treatments consistently would allow the use of acupuncture to become not only very effective but also economical by eliminating the need for the trained clinician to attend to the patient.

BRIEF SUMMARY OF THE INVENTION

The present invention fulfills these needs by providing easy to use devices, systems and methods that target auricular acupuncture points via focused, directed energy such as laser or electrical energy, without the need for direct, in-clinic contact with a practitioner.

In embodiments, provided herein are auricular acupuncture devices, including an ear retention device conformable to an auricular surface of a mammalian ear, the ear retention device including a plurality of energy output sites corresponding to auricular acupuncture points of the mammalian ear, wherein the energy output sites are positioned to substantially contact the auricular surface of the mammalian ear. The devices also include an energy interface module, including at least an optical energy source or an electrical energy source, optically or electrically coupled to the ear retention device, a device control module, electrically coupled to the energy interface module, a support structure for maintaining the ear retention device adjacent the auricular surface of the mammalian ear, a compliance detection element for determining that the auricular acupuncture device is correctly engaged, associated with the ear retention device or the support structure.

In embodiments, each of the energy output sites directs optical energy from the optical energy source to the auricular acupuncture points in sufficient levels to penetrate tissue of the mammalian ear and stimulate the auricular acupuncture points via refraction or redirection of the optical energy. Suitably, the optical energy is from a laser or a laser light emitting diode, for example from a laser at a power output of about 5 mW to about 50 mW and a wavelength of about 610 nm to about 685 nm. In further embodiments, each of the energy output sites includes an optical fiber connecting the optical energy source to energy output sites.

In embodiments, each of the energy output sites directs electrical energy from the electrical energy source to the auricular acupuncture points in sufficient levels to penetrate tissue of the mammalian ear and stimulate the auricular acupuncture points.

Suitably, the energy output sites of the ear retention device are made from a transparent or translucent material, with the remainder of the ear retention device being made from an opaque material.

In additional embodiments, the devices further comprise a speaker and/or a microphone for audio communication with the mammal, and suitably the microphone functions as the compliance detection element and is associated with the support structure (or the ear retention device). In additional embodiments, the compliance detection element is a temperature sensor, a resistivity sensor, and/or other detection sensor.

Also provided herein are systems for auricular acupuncture, comprising an auricular acupuncture device including an ear retention device conformable to an auricular surface of a patient's ear, the ear retention device including a plurality of energy output sites corresponding to auricular acupuncture points of the patient's ear, wherein the energy output sites are positioned to substantially contact the auricular surface of the patient's ear, an energy interface module, including at least an optical energy source or an electrical energy source, optically or electrically coupled to the ear retention device, a device control module, electrically coupled to the energy interface module, a support structure for maintaining the ear retention device adjacent the auricular surface of the patient's ear, and a compliance detection element for determining that the auricular acupuncture device is correctly engaged, associated with the ear retention device or the support structure. The systems also suitably further include a remote database system wirelessly coupled to the auricular acupuncture device.

Suitably, the remote database system is capable of receiving feedback from the auricular acupuncture device and from the patient regarding the auricular acupuncture, and the remote database system can store patient and treatment information. In embodiments, the remote database system receives information from the compliance detection element to confirm that the auricular acupuncture device is correctly engaged. Suitably, the information received from the compliance detection element is one or more of temperature information, resistivity information, and voice recognition or feedback.

In further embodiments, the remote database system includes an artificial intelligence software engine or other software engine. Suitably, the remote database system provides feedback to the patient.

In embodiments, the feedback provided to the patient includes: auditory commands via a speaker associated with the support structure, visual commands via a light or light emitting diode associated with the support structure, and/or haptic commands via one or more haptic actuators associated with the ear retention device or the support structure.

The systems can further include a test fixture system connectable to the auricular acupuncture device, the test fixture system configured to monitor the functioning of the auricular acupuncture device prior to and/or after a treatment cycle.

Suitably, the remote database system is wirelessly coupled to device control module and the compliance detection element.

Also provided are methods of treating a medical condition or a presenting symptom in a patient, comprising engaging an auricular surface of the patient's ear with an auricular acupuncture device, including an ear retention device conformable to the auricular surface of the patient's ear, the ear retention device including a plurality of energy output sites corresponding to auricular acupuncture points of the patient's ear, wherein the energy output sites substantially contact the auricular surface of the patient's ear, an energy interface module, including at least an optical energy source or an electrical energy source, optically or electrically coupled to the ear retention device, a device control module, electrically coupled to the energy interface module, a support structure for maintaining the ear retention device adjacent the auricular surface of the patient's ear, and a compliance detection element for determining that the auricular acupuncture device is correctly engaged, associated with the ear retention device or the support structure. The methods further include initiating an optical or an electrical energy signal from the energy interface module; and passing the optical or the electrical signal through the ear retention device to the auricular acupuncture points on the auricular surface of the patient's ear in sufficient levels to penetrate tissue of the patient's ear and stimulate the auricular acupuncture points.

The methods can further include receiving a response from the patient regarding the treatment, from the compliance detection element, including an auditory response from a microphone, or receiving a response from the compliance detection element, including wherein the response is temperature information and/or resistivity information.

The methods can also further include providing feedback to the patient via a remote database system wirelessly coupled to the auricular acupuncture device, wherein the feedback includes: auditory commands via a speaker associated with the support structure or associated with the ear retention device, visual commands via a light or light emitting diode associated with the support structure, and/or haptic commands via one or more haptic actuators associated with the ear retention device or the support structure.

In suitable embodiments, the auricular acupuncture points include at least the auricular acupuncture points of Shenmen, Yuanzhong and Fei.

Also provided are methods of making an ear retention device, comprising inserting a plastic molding compound against an auricular surface of a mammalian ear, allowing the plastic molding compound to set into a molded auricular structure, removing the molded auricular structure from the auricular surface, creating a plurality of energy output sites in the molded auricular structure, corresponding to auricular acupuncture points of the mammalian ear, and inserting one or more energy conductive path elements into the molded auricular structure to create the ear retention device. The methods can also further include inserting a temperature sensor, a resistivity sensor and/or a speaker into the molded auricular structure, and suitably the energy conductive path elements are inserted at the energy output sites.

Additional methods of making an ear retention device are also provided, which include obtaining a two-dimensional photograph of an auricular surface of a mammalian ear, identifying on the two-dimensional photograph, points corresponding to auricular acupuncture points of the mammalian ear, processing the two-dimensional photograph along with known dimensions of the mammalian ear to create a three-dimensional plan for the ear retention device, including a plurality of energy output sites at the points corresponding to auricular acupuncture points of the mammalian ear, printing an auricular model using a three-dimensional printer, and inserting one or more energy conductive path elements into the auricular model to create the ear retention device.

In still further embodiments, a method of making an ear retention device is provided, comprising obtaining a three-dimensional scan of an auricular surface of a mammalian ear, identifying on the three-dimensional scan, points corresponding to auricular acupuncture points of the mammalian ear, processing the three-dimensional scan along with known dimensions of the mammalian ear to create a three-dimensional plan for the ear retention device, including a plurality of energy output sites at the points corresponding to auricular acupuncture points of the mammalian ear, printing an auricular model using a three-dimensional printer, and inserting one or more energy conductive path elements into the auricular model to create the ear retention device.

BRIEF DESCRIPTION OF DRAWINGS

The foregoing and other features and aspects of the present technology can be better understood from the following description of embodiments and as illustrated in the accompanying drawings. The accompanying drawings, which are incorporated herein and form a part of the specification, further serve to illustrate the principles of the present technology. The components in the drawings are not necessarily to scale.

FIG. 2A shows an expanded view of a portion of an auricular acupuncture device, in accordance with embodiments hereof.

FIG. 2B shows a still further expanded view of a portion of an auricular acupuncture device, in accordance with embodiments hereof, including interface with FIG. 5.

FIGS. 4D-4F show a further method for delivery of energy via an auricular acupuncture device, in accordance with embodiments hereof.

FIGS. 6A-6C shows various methods of making ear retention devices, in accordance with embodiments hereof.

DETAILED DESCRIPTION OF THE INVENTION

Figure 1A:
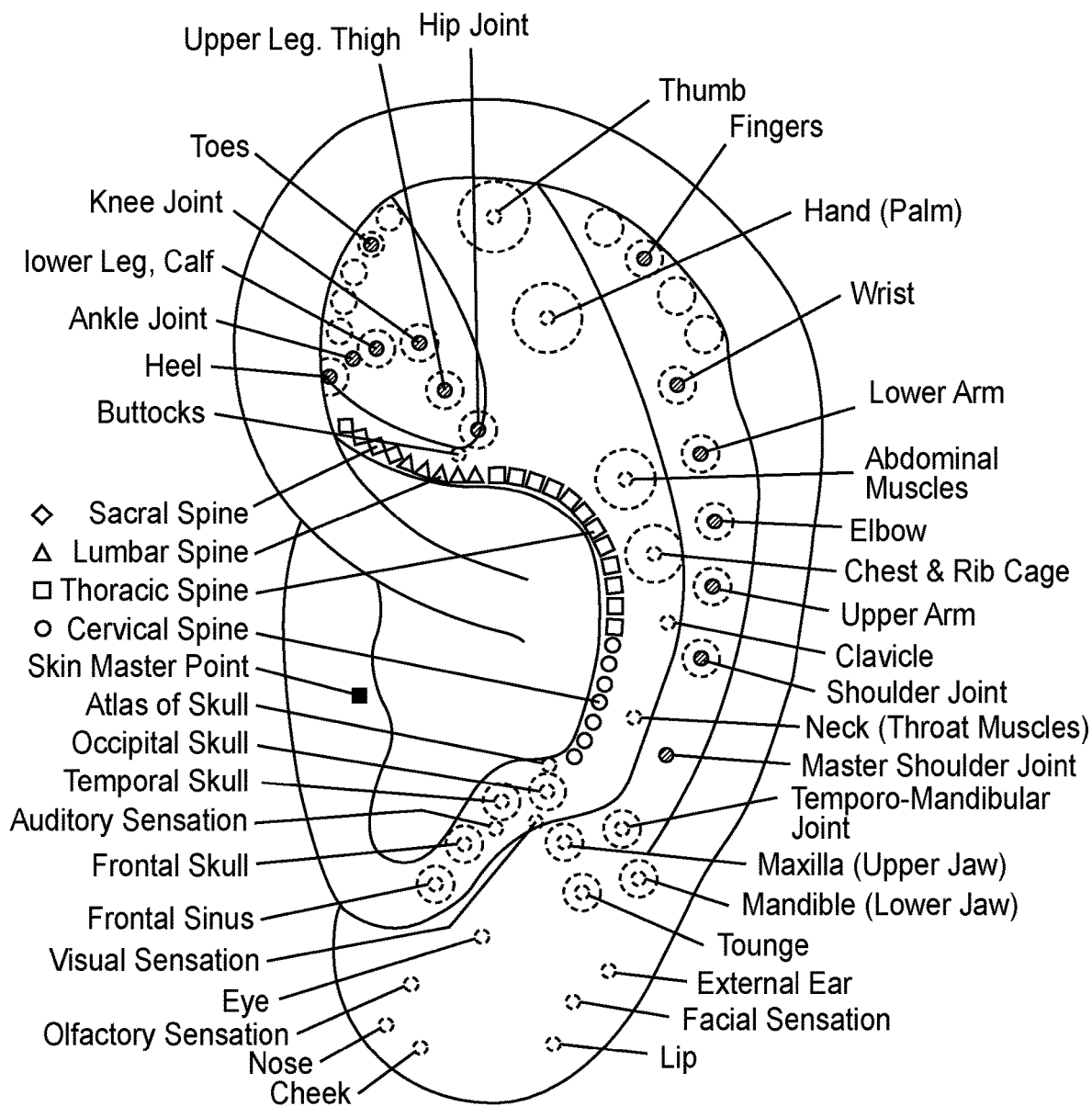
FIG. 1A shows a "map" of the auricular surface of the ear, illustrating the positioning of various acupuncture points and their corresponding locations in the body (See shuswaptcm.com).

It should be appreciated that the particular implementations shown and described herein are examples and are not intended to otherwise limit the scope of the application in any way.

The published patents, patent applications, websites, company names, and scientific literature referred to herein are hereby incorporated by reference in their entirety to the same extent as if each was specifically and individually indicated to be incorporated by reference. Any conflict between any reference cited herein and the specific teachings of this specification shall be resolved in favor of the latter. Likewise, any conflict between an art-understood definition of a word or phrase and a definition of the word or phrase as specifically taught in this specification shall be resolved in favor of the latter.

As used in this specification, the singular forms "a," "an" and "the" specifically also encompass the plural forms of the terms to which they refer, unless the content clearly dictates otherwise. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 20%.

Technical and scientific terms used herein have the meaning commonly understood by one of skill in the art to which the present application pertains, unless otherwise defined. Reference is made herein to various methodologies and materials known to those of skill in the art.

Unlike acupuncture treatments protocols which require acupuncture professionals to see patients at frequent intervals at their office, the methods, devices and systems described herein allow stimulation of specific acupuncture points on timed intervals, such as hourly, daily, or as may be required or desired, without attendance at an acupuncture professional's office. Further features allow the systems to communication to a remote database, including information such as the timing of each acupuncture treatment, its duration, and other characteristics, for use by review by both acupuncture clinicians as well as law enforcement agencies in cases where the methods and protocols serve as a substitute for legal drug enforcement.

It is well proven through numerous studies and clinical programs that specific acupuncture points within the ear (auricular acupuncture points) have a direct connection to segments of the brain that are related to various conditions. As described herein, the use of laser radiation and/or electrical impulses at specific frequencies, intensity levels and durations, create the acupuncture stimulation at the same (or nearly the same) levels as traditional needle based acupuncture. Consequently, a laser- and/or electrical stimulation-based acupuncture system specifically directed at the desired auricular acupuncture points provides methods of treatment for various medical conditions and presenting symptoms, as described herein.

In embodiments, provided herein are auricular acupuncture devices. As used herein, "auricular acupuncture" refers to the stimulation of acupuncture points on the external surface of the ear (suitably the inner surface, facing away from the head). As described throughout, stimulation at such acupuncture points has been determined to aid in the treatment of medical conditions and the reduction or elimination of presenting symptoms related to various health conditions in varying areas of the body. FIG. 1A shows a map of the auricular surface of the ear, illustrating various acupuncture points and their corresponding locations in the body.

Figure 1B:
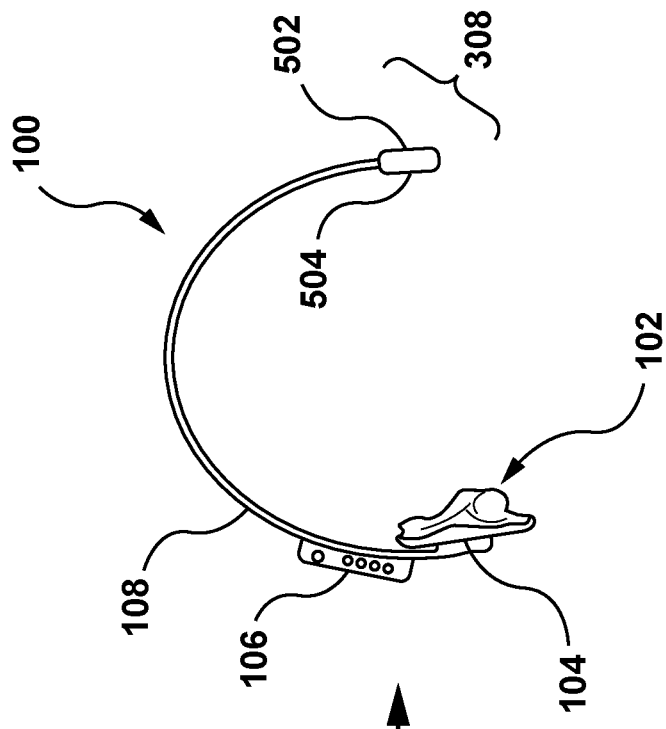
FIG. 1B shows an auricular acupuncture device, in accordance with embodiments hereof.

In embodiments, as shown in FIG. 1B, an auricular acupuncture device 100 includes an ear retention device 102. As used herein "ear retention device" refers to a structure which has been molded or generated to be conformable to an auricular surface of a mammalian (i.e., human, though can be cat, dog, horse, cow, primate, etc.) ear. As described herein, ear retention device 102 is suitably prepared to conform with the physical anatomy and scale of a patient's ear, suitably a human, so that ear retention device 102 fits against the auricular surface of the ear, with little or no lateral or transverse movement, thereby aiding in the precise application of auricular acupuncture. Ear retention device 102 is designed so that it is custom fit to each patient, to allow for a comfortable fit against the auricular surface of the ear. While FIG. 1B shows auricular acupuncture device 100 including a single ear retention device 102, it should be noted that a second ear retention device 102 (as well as the remaining elements of auricular acupuncture device 100) can be duplicated on the opposite side, so that a device can interact with each ear of a patient (i.e., worn as if a pair of headphones).

Figure 3B:
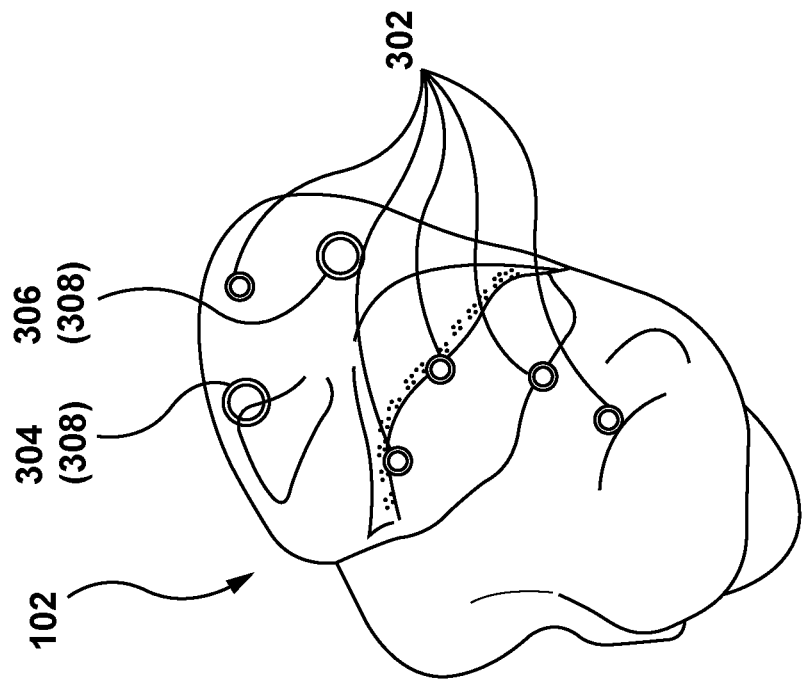
FIGS. 3A-3B show details of an ear retention device, in accordance with embodiments hereof.
Figure 3A:
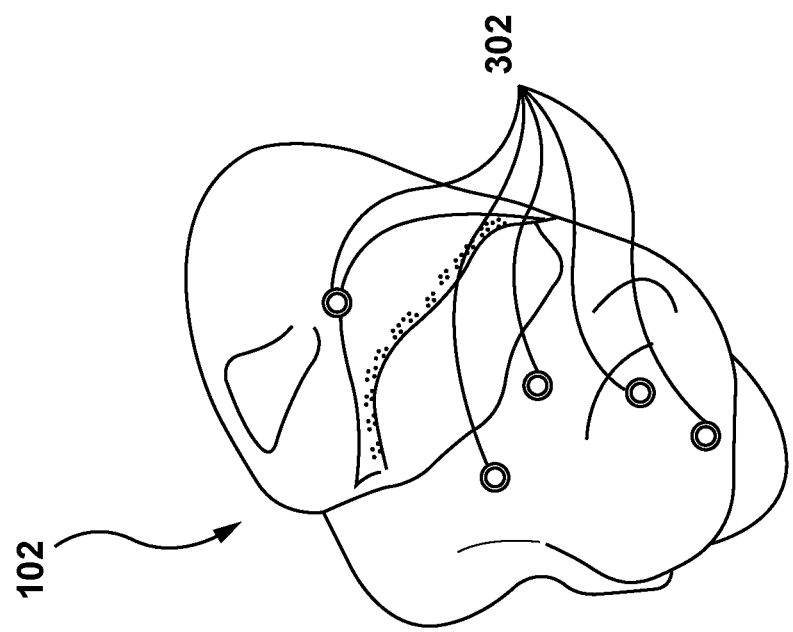

As shown in FIG. 3A, ear retention device 102 suitably includes a plurality of energy output sites 302. Energy output sites 302 correspond to auricular acupuncture points of the mammalian ear. That is, energy output sites 302 are located at sites in ear retention device 102 such that, when placed against the auricular surface of the ear, line up or correlate with one or more auricular acupuncture points of the patient's ear. As used herein a "plurality of energy output sites" refers to 2 or more, suitably 3 or more, 4 or more, 5 or more, 6 or more, 7 or more, 8 or more, 9 or more, 10 or more, etc., sites. In embodiments, each of these energy output sites corresponds to a different auricular acupuncture site of the ear, each of which corresponds to a different portion of the mammalian (human) body, or a different treatment site or treatment modality/condition.

Figure 4A:
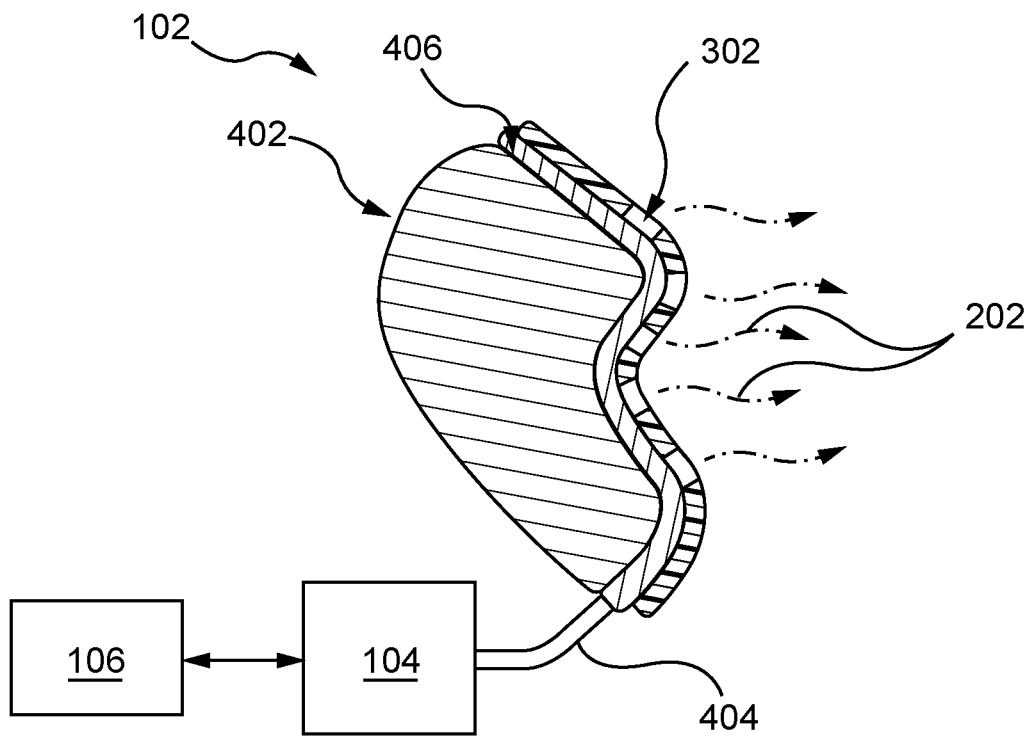
FIGS. 4A-4B show further details of an ear retention device, in accordance with embodiments hereof.
Figure 4B:
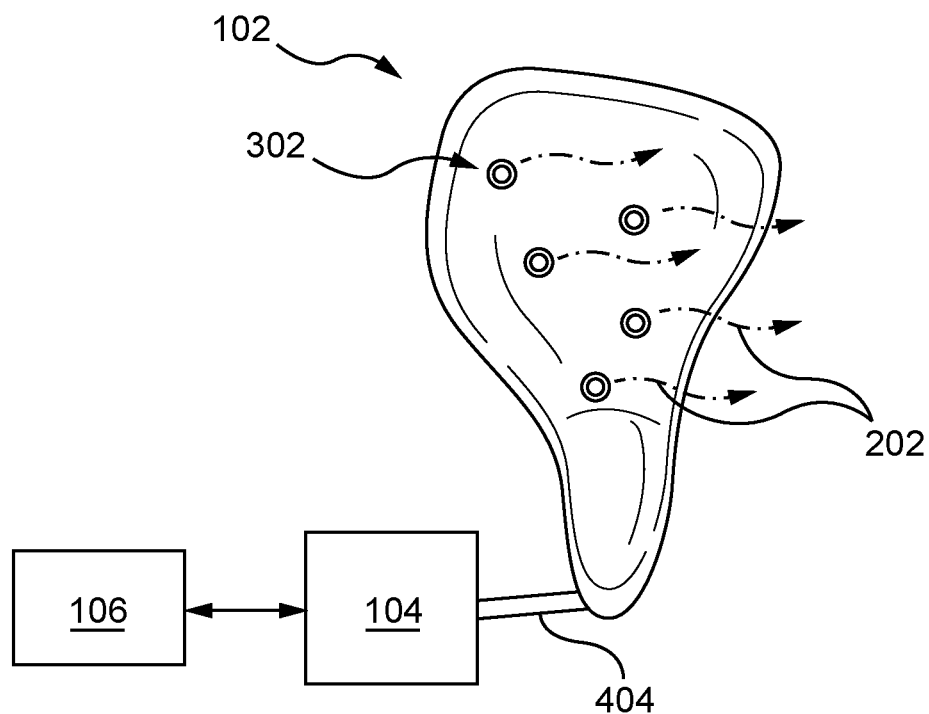
Figure 4C:
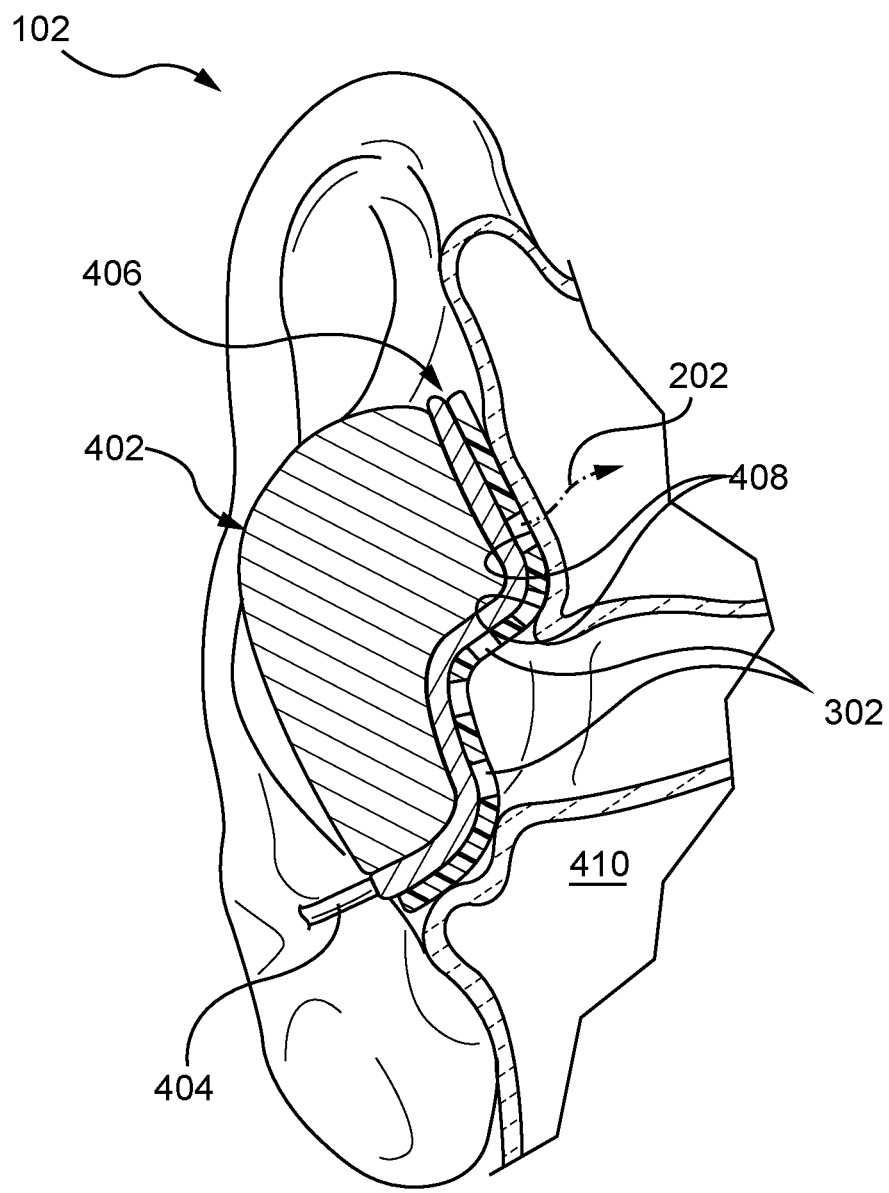
FIG. 4C shows an ear retention device positioned against an auricular surface of an ear.

As described herein, as shown in FIG. 4C, energy output sites 302 are positioned in ear retention device 102 so as to substantially contact auricular surface 408 of mammalian ear 410. As used herein "substantially contact" with regard to the positioning of ear retention device 102 in relation to auricular surface 408, means that ear retention device 102 (and thus energy output sites 302) is within about 5 mm from auricular surface 408, suitably within about 4 mm, within about 3 mm, within about 2 mm, within about 1 mm, and more suitably, is in direct contact with auricular surface 408. As described herein, the ability of ear retention device 102 to substantially contact auricular surface 408 allows for energy output sites 302 to be in direct, or nearly direct, contact with auricular surface 408 and thus direct sufficient levels of energy to penetrate the tissue of the mammalian ear and stimulate the auricular acupuncture points, at the specific, desired auricular acupuncture points, as desired.

As shown in FIG. 1B, in embodiments, auricular acupuncture device 100 also includes an energy interface module 104. Energy interface module 104 refers to a device or structure capable of delivering an energy signal 202 to auricular surface 408 of ear 410. In embodiments, energy interface module 104 includes at least an optical energy source or an electrical energy source, and can include both an optical energy source and an electrical energy source. The optical energy source is suitably optically coupled (e.g., via suitable fiber optics, lenses, prisms, mirrors, or other carriers or optical energy) to ear retention device 102, so as to allow optical energy to pass from the optical energy source to ear retention device 102, and energy output sites 302, to ultimately reach auricular surface 408 of ear 410. In additional embodiments, energy interface module 104 includes an electrical energy source. The electrical energy source is suitably electrically coupled (e.g., via suitable wiring configurations) to ear retention device 102, so as to allow electrical energy to pass from the electrical energy source to ear retention device 102, and energy output sites 302, to ultimately reach auricular surface 408 of ear 410.

In embodiments, auricular acupuncture device 100 also includes a device control module 106, suitably electrically coupled (i.e., appropriately wired) to energy interface module 104. As described throughout, device control module 106 includes various elements for controlling the timing, output power and frequency, etc., of the energy signal that is being delivered by energy interface module 104.

As described herein, the use of local area communication protocols such as Bluetooth and Near Field Radio (NFR), allow for improved health care and addiction treatment in particular enabling interaction with various sensors, databases and control systems. The protocols and potential additional protocols which may be available in the future allow for high speed, low power digital communication from wearable devices, including those described herein, to handheld devices including phones, tablets, smartwatches, etc. Wearable sensor devices which can measure, quantify and communicate with each other and with the auricular acupuncture devices described herein, which then have the capability through CPU interaction to communicate remotely to off-site data base systems, or computer systems, through either direct digital communication protocols such as 4G, 4G LTE or future system such as 5G or others yet to be developed. The auricular acupuncture devices described herein can also communicate with remote databases through either direct Ethernet communication or WIFI communication protocols. As described herein, various sensors, including wearable body sensors, can be configured to monitor a characteristic of a patient and communicate data to larger database systems which can be further analyzed through machine learning algorithms, or Artificial Intelligence (AI) to evaluate, diagnose and report health care conditions to benefit the patient in numerous ways.

In the case of treatment for addiction, pain and PTSD, the additional information available during a treatment session from wearable body sensors allows a more accurate evaluation of the patient's condition, and also allows for the AI system to assist with the evaluation of the patient's responses to specific questions posed by the AI system. For example, heart rate changes can be used to signal anxiety and/or deception.

Local systems can include machine learning algorithms and rules to allow the implementation of advanced physiological evaluation of a patient's condition and recommend medical, nutritional, physiological or pharmaceutical intervention for the treatment of addiction, PTSD and Pain or related physical or emotional conditions.

Figure 1C:
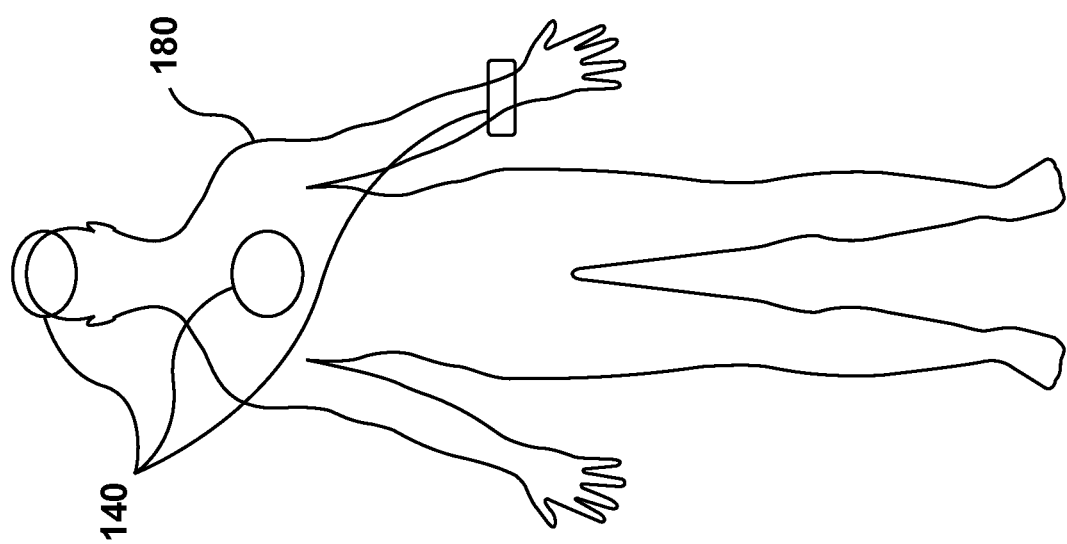
FIG. 1C shows exemplary sensors configured to transmit data to an auricular acupuncture device in accordance with embodiments hereof.

In exemplary embodiments, as shown in FIG. 1C, device control module 106 is suitably configured to receive data from one or more sensors 140. As described herein, communication between sensors 140 and device control module 106 can be via wireless communication, including Bluetooth enabled communication, or can be via a separate external device that then communicates directly with auricular acupuncture device 100.

Suitably, sensors 140 are wearable sensors that are attached, connected, or otherwise associated with patient 180, so as to monitor various bodily functions or characteristics. Wearable sensors include heart rate sensors, body temperature sensors, heart EKG sensors and brain wave sensors. Such wearable sensors can be in the form of watches, wristbands or chest straps to monitor heart rate or heart EKG information, brain wave sensors worn on the head, or body temperature sensors that can be integrated into clothing or other wearable items. Locations and shapes/orientations of sensors 140 shown in FIG. 1C are for illustrative purposes only and to provide context for the types of sensors and information that can be communicated to auricular acupuncture device 100.

In further embodiments, as shown in FIG. 1B, auricular acupuncture device 100 also suitably includes a support structure 108 for maintaining ear retention device 102 adjacent auricular surface 408 of mammalian ear 410. As shown in FIG. 1B, support structure 108 can be in the form of an overhead (top of the head), or behind the neck, connecting structure (i.e., as in traditional headphones). In further embodiments, support structure 108 can be in the form of a behind-the-ear element that maintains the positioning of ear retention device 102 adjacent auricular surface 408 (i.e., as in individual ear pieces). As shown in FIG. 2A, support structure 108 is also suitably connected to device control module 106 and energy interface module 104, allowing for structural support for each of these elements and aiding in maintaining their positioning during use of auricular acupuncture device 100, as well as allowing for portability of the device.

FIG. 2B shows a further expanded view of auricular acupuncture device 100, further illustrating exemplary locations for device control module 106, connector 522, which suitably connects device control module 106 to energy interface module 104, as well as support structure 108. As illustrated in FIG. 2B, connector 522 allows for communication and interaction between device control module 106 and energy interface module 104 (see discussion of FIG. 5, block diagram of auricular acupuncture device 100, herein). In addition, connector 522 allows for easy removal of ear retention device 102 and energy interface module 104, and then reconnection of a further ear retention device 102 and energy interface module 104. Ear retention device 102 can also be separately removed. This interchangeability allows for easy replacement of parts, as well as manufacturing of various sections with interchangeable parts to facilitate high volume production and easy swapping out of components. FIG. 2B also shows the passing of optical or electrical energy, as energy signal 202, from energy interface module 104 to ear retention device 102, and ultimately to ear 410, via energy output sites 302 (see also FIGS. 4A-4B discussed herein).

In exemplary embodiments, auricular acupuncture device 100 further includes a compliance detection element 308, associated with ear retention device 102. As used herein, "compliance detection element" refers to one or more sensors, feedback elements, etc., for determining that auricular acupuncture device 100 is correctly engaged. As used herein "correctly engaged," refers to a feature of the auricular acupuncture device 100, which helps to ensure that the proper patient is utilizing auricular acupuncture device 100, that the auricular acupuncture device 100, including ear retention device 102, is properly situated adjacent auricular surface 408 of ear 410, that the appropriate conditions are utilized (e.g., timing and/or duration of a treatment, energy settings and outputs, correct auricular acupuncture points, etc.), and other conditions to ensure that auricular acupuncture device 100 is being properly utilized and that the treatment is being applied correctly. Compliance detection element 308 can also be used to ensure that auricular acupuncture device cannot be turned on until the device is appropriately engaged.

In embodiments, the devices, systems and methods provided herein direct energy from energy output sites 302 of energy interface module 104 to auricular acupuncture points (see, e.g., FIG. 1A) on auricular surface 408 of ear 410, in sufficient levels to penetrate tissue of mammalian ear 410 and stimulate the auricular acupuncture points. As described herein, these "sufficient levels" of energy (i.e., energy signal 202) are at a power, frequency and duration such that they can pass through the outer surface layers of the skin and other tissue and directly stimulate or impact the desired auricular acupuncture points with enough energy to cause a desired clinical effect. That is, the patient receiving the auricular acupuncture is provided with sufficient energy via auricular acupuncture device 100 such that he or she perceives a beneficial impact on a presented symptom, or a clinically measurable impact on a medical condition is achieved.

As described throughout, suitably energy signal 202 is from an optical energy source and is in the form of a laser, laser light emitting diode, or other form of optical energy, and can be directed from the optical energy source to energy output sites 302 using refraction or redirection of the optical energy, including the use of various mirrors, prisms, lenses light guides, fiber optics, etc. In embodiments where the optical energy is in the form of laser light from a laser energy source, the laser will suitably have a power output of about 5 mW to about 50 mW, and a wavelength of about 610 nm to about 685 nm. In further embodiments, the laser light from the laser energy source will have a power output of about 10 mW to about 50 mW, about 20 mW to about 40 mW, about 30 mW to about 40 mW, or about 10 mW, about 20 mW, about 25 mW, about 30 mW, about 35 mW, about 40 mW or about 50 mW. Additional power outputs can be utilized to provide sufficient energy levels to penetrate tissue of mammalian ear 410 and properly stimulate the auricular acupuncture points. Exemplary wavelengths of optical energy can include 400 nm to about 1000 nm, suitably about 500 nm to about 700 nm, or about 600 nm to about 700 nm, about 625 nm to about 675 nm, about 640 nm to about 660 nm, or about 620 nm, about 630 nm, about 640 nm, about 650 nm, about 660 nm, about 670 nm or about 680 nm.

Exemplary laser light sources include red lasers (about 650 nm wavelength), from EGOSMOS, Burnaby, BC, Canada, or other manufacturers that provide similar laser light sources. Suitable characteristics of laser light sources for use in the devices, systems and methods described herein are set forth below:

| Specifications(T = 25° C.) | | |
|---|---|---|
| Items | Symbols | H8365050D/R, H8565050D/R |
| Mode | | CW |
| Wavelength | λ | 650 nm |
| Lens | | Glass |
| Spot | D/R | Dot/Round |
| Spot Size | D | <6 × 8 mm at 10m |
|  | R | <10 mm round at 3m |
| Diameter × Length | Φ × I | 8 × 20 mm |
| Output Power | Po | <50 mw |
| Power Stability | | <5% |
| Divergence Angle | mrad | <0.7 |
| Operating Voltage(DC) | Vo | 3 V/5 V |
| CW Operating Current | Io | 130~150 mA, 180 mA max |
| Operating Temperature | To | −10° C.~+50° C. |
| Storage Temperature | Ts | −40° C.~+85° C. |
| Housing Material | | Aluminum |
| Mean time to failure | | >8000 hrs |

| | | Example: S | | | |
|---|---|---|---|---|---|
| Product Code of the laser modules | 8 Laser Module Diameter | 3 Working Voltage | 635 Wavelength (nm) | 5 Power | D Laser Spot Pattern |
| S: Standard | 4: 4 mm | 1: 1.5 VDC | 405: 405 nm | 1: 1 mW | D: Dot/Ellipse |
| H: High-End | 6: 6 mm | 3: 3 VDC | 532: 532 nm | 5: 5 mW | R: Round |
| | 8: 8 mm | 4: 4.5 VDC | 635: 635 nm | 10: 10 mW | L: Line |
| | 9: 9 mm | 5: 5 VDC | 650: 650 nm | 20: 20 mW | G: Ground Line |
| | A: 10 mm | 6: 6 VDC | 780: 780 nm | 30: 30 mW | C: Cross |
| | B: 12 mm | 9: 9 VDC | 808: 808 nm | 50: 50 mW | S: Special Pattern |
| | C: 20 mm | A: 12 VDC | 850: 850 nm | 80: 80 mW | |
| | X: Custom made | B: 24 VDC | 980: 980 nm | 100: 100 mW | |

-continued

| | | | | |
|---|---|---|---|---|
| D: 2.7~6 VDC | 1310: 1310 nm | 500: 500 mW | | |
| X: Custom made | 1550: 1550 nm | 1 W: 1000 mW | | |
| AC: 90~240 V AC Power | more: please refer to our available Laser Diodes | | | |

Laser Diode Product ID Naming Rule:

| Product Code: Laser Diode | Package Diameter | Top(° C.) | Wavelength Lambda( nm) | Output Power | Package Type |
|---|---|---|---|---|---|
| D: Laser Diode | 3: TO Dia.3.3 mm | 4: 40 | 405: 405 nm | 3: 3 mW | N: type |
| | 4: TO Dia.3.8 mm | 5: 50 | 450: 450 nm | 5: 5 mW | P: type |
| | 6: TO-18 Dia.5.6 mm | 6: 60 | 635: 635 nm | 10: 10 mW | M: type |
| | 9: TO-5 Dia.9.0 mm | 7: 70 | 780: 780 nm | 50: 50 mW | |
| | C: C-Mount | 8: 80~85 | 808: 808 nm | 100: 100 mW | |
| | | | 850: 850 nm | 200: 200 mW | |
| | | | 980: 980 nm | 500: 500 mW | |
| | | | 1550: 1550 nm more | 1 W: 1000 mW more | |

In additional embodiments, the energy output sites direct electrical energy from an electrical energy source to the auricular acupuncture points, suitably at current levels of about 0.1 mA to about 5 mA (constant, direct current), at a monophasic frequency (e.g., about 0.5 to about 2 Hz, suitably about 1 Hz). In suitable embodiments, the current level of the electrical energy is about 0.5 mA to about 4 mA, about 1 mA to about 3 mA, about 1.5 mA to about 2.5 mA, or about 1 mA, about 1.5 mA, about 2 mA, about 2.5 mA or about 3 mA. Additional current levels can be utilized to provide sufficient energy levels to penetrate tissue of mammalian ear 410 and properly stimulate the auricular acupuncture points.

In exemplary embodiments, each energy output site 302 includes an optical fiber that connects the optical energy source to energy output sites 302. In embodiments, for example as shown in FIGS. 4A-4B, energy interface module 104 (suitably including a laser light source) provides an optical energy signal (e.g., a laser light), that passes through an energy conveying structure (such as a first fiber optic cable or waveguide), into energy conveying path 406, and then further to energy output sites 302 (see FIG. 4A, cross-sectional view of ear retention device 102). The path from energy conveying path 406 to energy output sites 302 suitably includes one or more optical fibers, each terminating at energy output sites 302, at the auricular acupuncture sites. As shown in FIG. 4B (front view of ear retention device 102), energy signal 202 (e.g., laser light) is then transmitted from energy output sites 302, to ultimately impact auricular surface 408 of ear 410 (see FIG. 4C, illustrating the positioning of auricular surface 408 in substantial contact with each energy output site 302, i.e., directly abutting ear retention device 102, or within 1-5 mm from each other).

In further embodiments, energy output sites 302 of ear retention device 102 are made from a transparent or translucent material, such as a transparent plastic or rubber. The remainder of ear retention device 102, i.e., ear fitting component 402, can suitably be made from an opaque material, such as an opaque plastic or rubber. As shown in FIG. 4A, in embodiments, an optical energy, such as a laser light, is passed from energy interface module 104 to energy conveying structure 404 (e.g., a fiber optic cable). The light then travels along the length of ear retention device 102, (can be via energy conductive path 406), exiting the device at energy output site 302 that are transparent or translucent, but not passing into ear fitting component 402 section of ear retention device 102, due to the opaque nature of this section. In such embodiments, individual fiber optic cables for each energy output site 302 are not required, as the laser light simply escapes via transparent or translucent sections of ear retention device 102, at the desired sites.

In a still further embodiment as shown in FIG. 4D, light can travel through multiple channels 420 (e.g., hollow channels inside ear retention device 102), exiting the device a energy output sites 302. Suitably, the energy output sites 302 of ear retention device 102 pass energy by way of hollow channels in the ear retention device which are filled with a transparent or translucent material conducive to providing an optical waveguide for the energy to pass through the ear retention device and out to the articular points on auricular surface 408. The remainder of ear retention device 102 is suitably made from an opaque material, and the precise location and size of the energy output sites 302 can be controlled in the final part of a printing process (described herein) with a final opaque material printed over the energy output sites to create an 'aperture' for the energy. In FIG. 4D, a masking material is not utilized.

FIG. 4E shows a further embodiment, in which masking material 440 is printed on ear retention device 102. As with FIG. 4A, in embodiments, an optical energy, such as a laser light, is passed from energy interface module 104 to energy conveying structure 404 (e.g., a fiber optic cable) or multiple energy conveying structures 404 in the form of hollow channels within the ear retention device. The light then exits the device through openings 450 in masking material 440 at output site 302. Masking material 440 can be used to restrict the size of openings 450 and the location of openings 450, to coincide with energy output site 302.

Figure 4F:
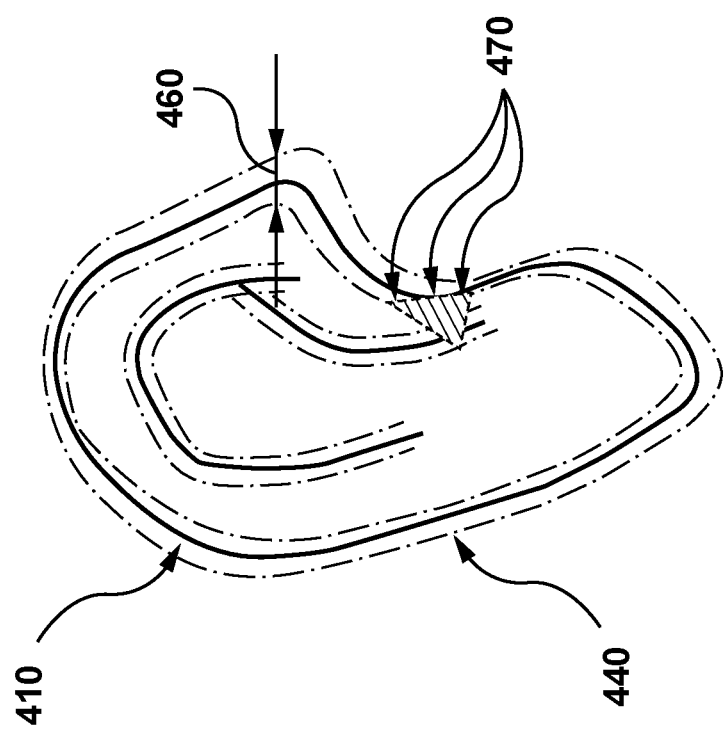

FIG. 4F shows the alignment of masking material 440 in relation to ear 410, illustrating the alignment tolerance (Ta)

460. Also illustrated is an optical registration fiducial, an object placed in the field of view of an imaging system which appears in the image produced, for use as a point of reference or a measure. As shown in FIG. 1B, auricular acupuncture device 100 suitably further includes a speaker 502 and/or a microphone 504. Speaker 502 and microphone 504 are designed to allow audio communication between the patient and the device, including external control elements or databases as described herein. In FIG. 1B, speaker 502 and microphone 504, are shown as connected to support structure 108, but they also be connected to or contained within ear retention device 102 or device control module 106. Speaker 502 and microphone 504 can be integrated into support structure 108, or can be separate elements, for example a separate earpiece that is opposite ear retention device 102, and can interact with a patient's other ear that is not receiving the auricular acupuncture treatment. As described herein, the audio communication with the mammal can include receiving verbal communication from the mammal (i.e., human patient), providing verbal or auditory instructions to the mammal, including for example security codes to assure that the ear retention device is properly inserted prior to the start of a treatment protocol, as well as simply providing music, audio tones or other auditory stimulation to enhance a treatment protocol.

As described herein, suitably microphone 504 functions as compliance detection element 308, in that it is via microphone 504 that a patient can provide verbal commands or confirmation to an external database and/or practitioner confirming their identity (i.e., the correct patient is being treated by providing personal information or via voice recognition software), confirming the desired treatment, feedback from the treatment, confirming word, phrase or number codes received from speaker 502, etc.

As shown in FIG. 3B, in further embodiments, ear retention device 102 suitably includes one or more compliance detection elements 308, which can include a temperature sensor 306 and/or a resistivity sensor 304. Additional examples of compliance detection elements 308 that can be included in ear retention device include various detection sensors such as moisture data (i.e. skin moisture content), pH information (i.e., skin pH), positional or orientation information (i.e., location with respect to height or rotation), contact confirmation (i.e., confirming physical contact with a surface), etc. As described herein, one function of compliance detection elements 308 is to determining that auricular acupuncture device 100 is correctly engaged with auricular surface 408 of a patient's ear 410, including confirming that it is the correct patient and that the device is correctly oriented or seated. Temperature sensor 308 is suitably a thermocouple or other similar device capable of determining that ear retention device 102 is in contact with, or substantially in contact with, a surface (an auricular surface) that has a temperature of about 34° C. to about 40° C., suitably about 37° C., i.e., about body temperature. Temperature sensor 308 is also used to measure and report the temperature of auricular surface 408 of a patient's ear during a treatment protocol, so as to detect changes in temperature as a result of an energy signal (laser or electrical) being imposed on the skin of the ear. This change in temperature and monitoring can detect correct operation of auricular acupuncture device 100, as well as determine if a device may be malfunctioning or creating too much heat. Resistivity sensor 304 is suitably a sensor for measuring the resistance of a skin surface (i.e., the resistance of the skin to electric current flow). Typically such sensors are able to measure resistance on the order of about 1,000 to about 100,000 Ohms, the general range of resistivity of dry skin. Exemplary resistivity sensors 304 are skin electrical contact devices that can include miniature gold plated springs to measure the resistance of the ear skin connection to verify ear retention device 102 is properly inserted. This resistance is measured via a voltage signal between the two springs and a connection to the analog inputs of a microprocessor. This data is then used to calculate the skin resistance between these two spring, thereby confirming that the ear retention device is inserted properly and tightly into the ear. This data in conjunction with skin temperature measurement also validates the time the device is inserted and removed.

Auricular acupuncture device 100 can also include an internal date clock which maintains the current time for use with recording treatment events, such as the start and end of a treatment protocol. This function can also be provided via a wireless connection to a time clock.

Figure 5:
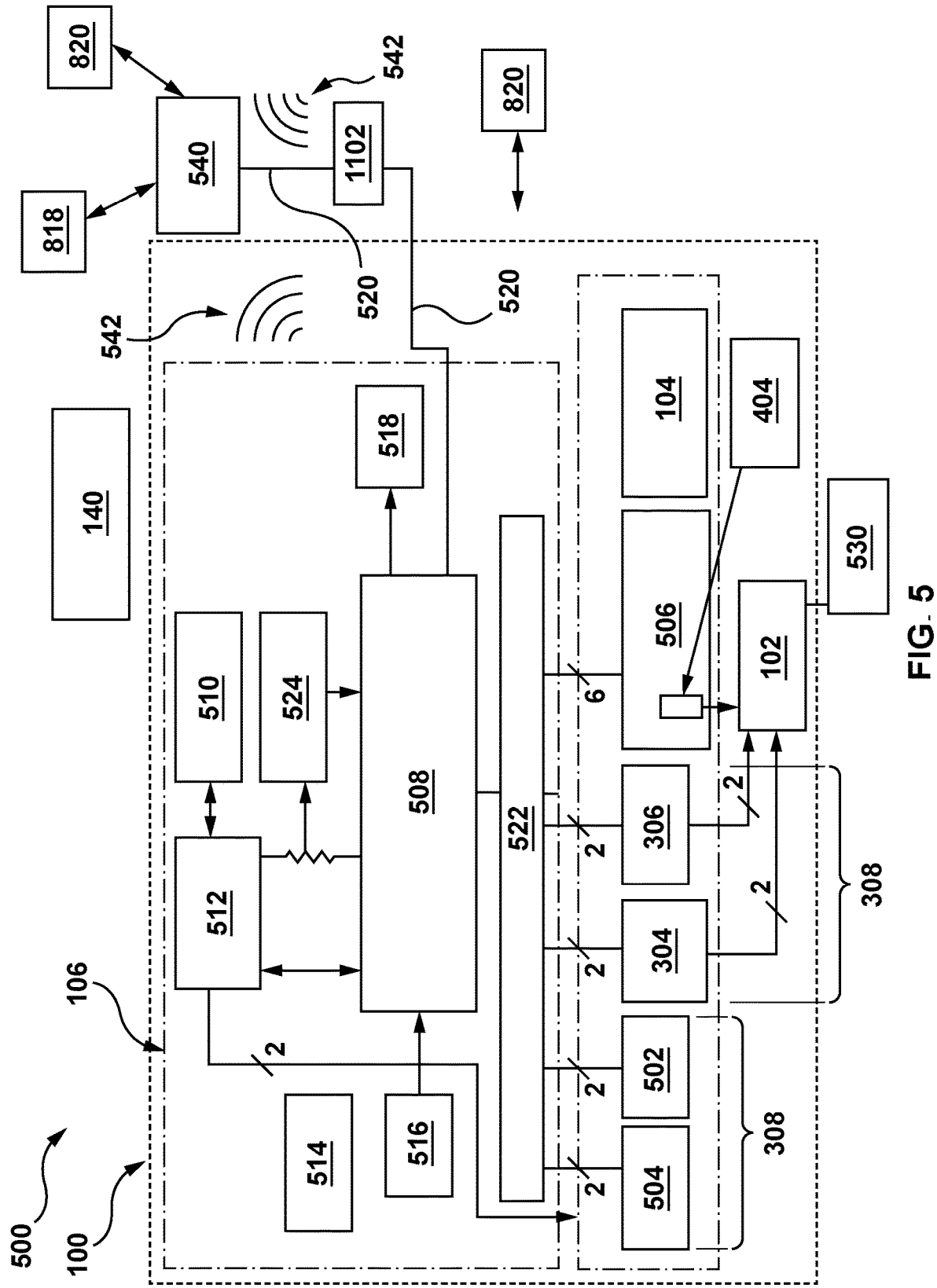
FIG. 5 shows a block diagram of a system for auricular acupuncture, in accordance with embodiments hereof.

In further embodiments, provided herein are systems for auricular acupuncture. FIG. 5 shows a block diagram of a system 500 for auricular acupuncture. In embodiments, system 500 includes auricular acupuncture device 100, which includes ear retention device 102, suitably conformable to auricular surface 408 of a patient's ear 410. As described herein, ear retention device 102 suitably includes a plurality of energy output sites 302 corresponding to auricular acupuncture points of the patient's ear 410. In embodiments, energy output sites 302 are positioned to substantially contact auricular surface 408 of the patients ear 410 (see e.g., FIG. 4C). Auricular acupuncture device 100 suitably further includes energy interface module 104, including at least an optical energy source or an electrical energy source, that is optically or electrically coupled to ear retention device 102. Auricular acupuncture device 100 also suitably includes device control module 106, electrically coupled to energy interface module 104, as well as support structure 108 for maintaining ear retention device 102 adjacent auricular surface 408 of patient's ear 410. Suitably, auricular acupuncture device 100 further includes compliance detection element 308 (or a plurality of compliance detection elements), for determining that auricular acupuncture device 100 is correctly engaged. Compliance detection element 308 is suitably associated with ear retention device 102 or support structure 108, as described herein.

System 500 also suitably includes a remote database system 540 wirelessly (542) and/or directly (520) coupled to auricular acupuncture device 100. Wireless couplings include radio communications, Wi-Fi communications, Bluetooth communications, optical couplings. Direct couplings include direct wired ethernet or internet couplings or direct electrical connections. Other suitable methods of coupling remote database system 540 to auricular acupuncture device 100 are known in the art.

Examining FIG. 5, the connectivity and interactions between various parts of system 500, ear retention device 102 (see also FIG. 2B), energy interface module 104 and device control module 106 of auricular acupuncture device 100, are represented diagrammatically. As described herein, in embodiments, ear retention device 102 suitably includes one or both of temperature sensor 306 and resistivity sensor 304, which can alone or together act as compliance detection element 308, providing feedback from contact between ear retention device 102 and a patient. Energy interface module 104 suitably includes energy output drivers and modules 506, as well as energy conveying structure 404 (e.g., suitably fiber optics). Also included are one or more of speaker 502 and microphone 504, which as described herein, can also act as compliance detection element 308.

Device control module 106 is suitably connected to energy interface module 104 via connector 522. Device control module 106 suitably includes components such as a battery system 510 (suitably a DC power source that can be recharged or replaced as needed), a programming port 512 with battery charging power and a microprocessor 508. Microprocessor 508 suitably includes various elements and characteristics to allow for radio, optical, or wireless (including Wi-Fi and Bluetooth), infrared connections (542), as well as or direct connections 520 or couplings to remote database 540 (including direct-wired ethernet or internet connections). Microprocessor 508 suitably includes Read only memory (ROM), Random Access memory (RAM), an Analog Digital Converter, a Digital to Analog Converter, Digital input and output points and Communication ports suitable to communicate with remote and local database systems. Additional elements of device control module 106 suitably include power 514 for energy output driver and modules 508, an enable/disable switch 516, a ground circuit current measurement 524, and a visual indicator 518 (which can be an LED indicator). As described further herein, system 500 can also be connected to or integrated with a test fixture system 530 to help with calibration of auricular acupuncture device 100 and to confirm that all of the various components are operating correctly and within specified parameters. Test fixture system 530 is generally an external device to which system 500 is connected to perform various monitoring, calibration or checking functions of auricular acupuncture device 100 prior to and/or after a treatment cycle, suitably for quality control. Device control module 106, and microprocessor 508 are also suitably connected to sensors 140 to allow for real-time feedback and interaction with various sensors providing patient data, including via wearable sensors. Such connections between sensors 140 and auricular acupuncture device, as well as between database 540 and/or a communication interface 1102 can be wireless, such as Bluetooth connections, as well as direct-wired connections. In additional embodiments, microprocessor 508 can communicate, either via direct-wired (520), and/or wireless connection (542) to communication interface 1102, which can be a smart phone, tablet, computer, or similar device. Communication interface 1102 can then communicate (e.g., via direct-wired (520) and/or wireless connection (542) to database 540.

Remote database system 540 is suitably housed in a patient treatment facility (i.e., hospital, clinic, doctor's office), but can also be housed and maintained at an offsite location to ensure patient confidentiality and security of patient and treatment data. Remote database system 540 is capable of performing various functions in combination with auricular acupuncture device 100. For example, remote database system 540 can receive feedback from auricular acupuncture device 100 and from the patient regarding the auricular acupuncture they are receiving. Remote database system 540 suitably stores patient data and treatment information, including physical and biographical data of the patient, treatment history, parameters of the desired treatment (i.e., power output, frequency, time of treatment, etc.), as well as data from sensors 140, including wearable sensors.

In embodiments, remote database system 540 receives information from compliance detection element(s) 308, to confirm that auricular acupuncture device 100 is correctly engaged. As described herein, information from compliance detection element(s) (308) can include one or more of temperature information from temperature sensor 306, resistivity information from resistivity sensor 304, and voice recognition or feedback from microphone 504. Additional information that can be received from compliance detection element 308 can include moisture data (i.e. skin moisture content), pH information (i.e., skin pH), positional or orientation information (i.e., location with respect to height or rotation), contact confirmation (i.e., confirming physical contact with a surface), etc.

In embodiments, remote database system 540 suitably includes an artificial intelligence software engine or other software engine that can compile the data received from auricular acupuncture device, and process the information in combination with patient data, provider instructions, etc., to determine appropriate changes or modifications to an auricular acupuncture session or treatment plan, etc.

In further embodiments, remote database system 540 provides feedback to the patient. Such information can be in the form of auditory commands via speaker 502 associated with the support structure or ear retention device, visual commands via a light or light emitting diode (e.g., visual indicator 518), suitably associated with the support structure, and/or haptic commands (e.g., vibration, texture, and/or heat, etc., transferred, via the sense of touch, from a system as described herein to a patient) via one or more haptic actuators (e.g., eccentric rotating mass (ERM) motor or linear resonant actuators (LRA)) associated with the ear retention device or the support structure.

As described herein, in embodiments, remote database system 540 is suitably coupled to both device control module 106 and compliance detection element(s) 308. This coupling can be in the form of radio, wireless (including Bluetooth), infrared or direct electrical connection to allow for communication between the various components. As described throughout, the communication between these components allows for real-time monitoring of patient use and compliance, as well as treatment protocol updates and directions.

Exemplary components of remote database system 540 can include a central cloud database to store routine event data and subjective responses from the patient, as well as an Artificial Intelligence processing Engine. Routine event data such as the history of all events of the system can also be stored. These events can include at least the following:

Time of insertion; Time that validity of insertion has occurred through the skin resistance sensor and the temperature sensor; Time that the stimulation cycle starts and ends; All events relating to the stimulation cycle including the stopping of the cycle, the removal of the device, or loss of insertion sensed through the resistance sensors or the temperature sensors; Patient prompting and Patient Feedback.

Each device for each patient can require an initial configuration. This configuration data may include a minimum of the following: 1. Patient name and DOB; 2. Type of treatment (1=Opioid, 2-smoking, 3-pain, 4=PTSD; 3. Expected length of treatment per insertion; 4. Insertion Intervals per day; 5. Electronic Connectivity Pairing Data; 6. Address of Cloud Storage; 7. Cloud Storage Password data; 8. Cloud storage miscellaneous information; 9. Other information as may be required or identified during further development of the system; 10. Other data as may be required to achieve the desired results.

Figure 7:
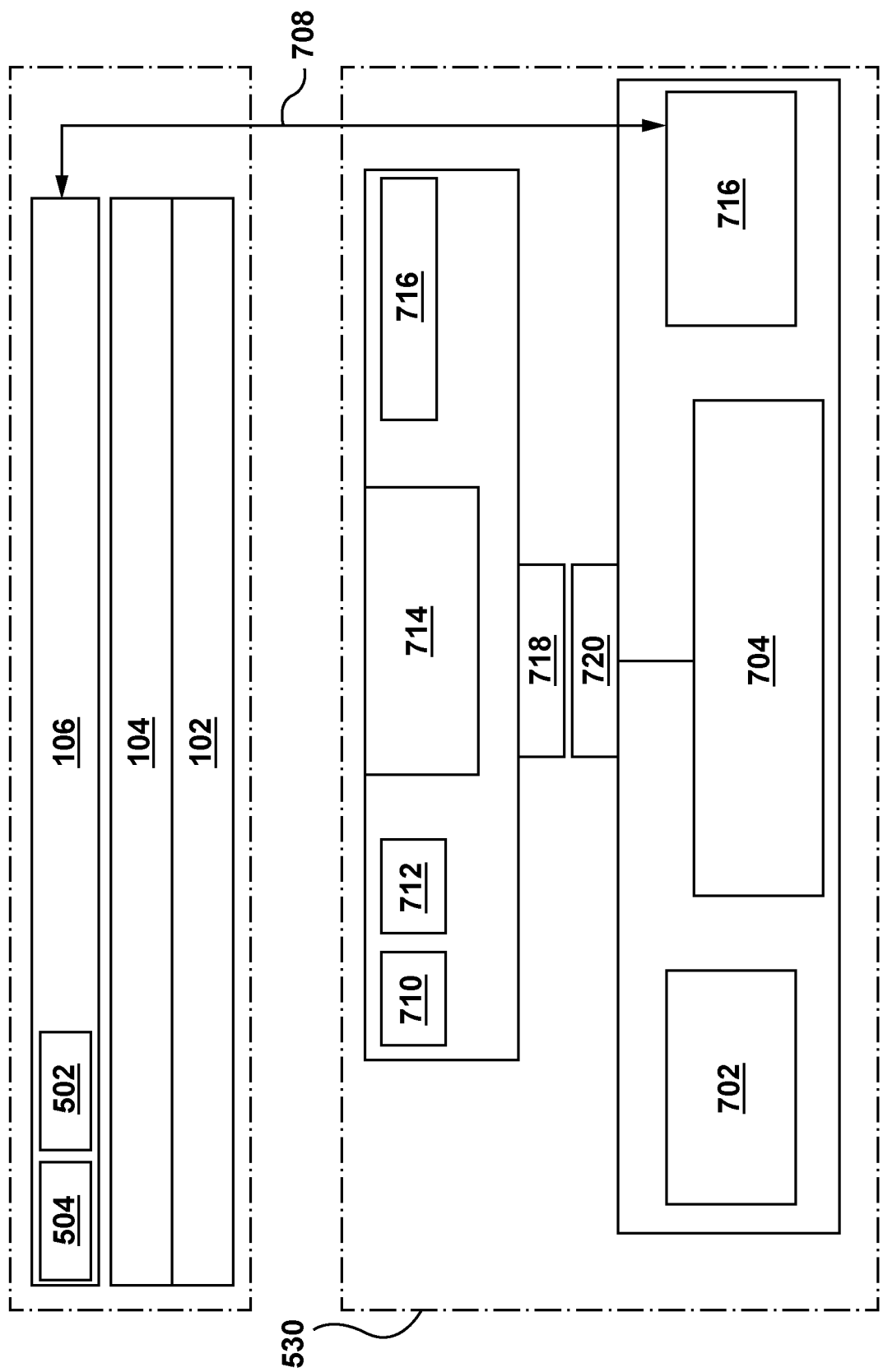
FIG. 7 shows a block diagram of an auricular acupuncture device and a test fixture in accordance with embodiments hereof.

In further embodiments, system 500 can be connected to or integrated with a test fixture system 530, configured to monitor the functioning of auricular acupuncture device 100 prior to and/or after a treatment cycle. This monitoring suitably occurs prior to deploying auricular acupuncture device 100 to a patient, and can happen prior to deployment to a Dr's office or clinic (i.e., as a quality control). As shown in FIG. 7, test fixture system is connectable to acupuncture delivery device 100 (suitably to device control module 106), for example via test fixture connection 708, which can be a direct, wired connection, or a wireless, radio or infrared connection. Test fixture system 530 suitably includes a test fixture controller 702, a test fixture microprocessor 704, and test fixture connection port 706. Test fixture system 530 can also include a calibrated temperature element 710, which can ensure the proper functioning of temperature sensor 306 by testing that the temperature sensor detects the proper temperature, and a calibrated resistance element 712, which can ensure the proper function of resistivity sensor 304 by testing that the resistivity sensor detects the correct resistance. Test fixture system 530 also suitably includes a calibrated energy signal sensor element 714, suitably a plurality of calibrated energy signal sensor elements. These calibrated energy signal sensor elements 714 are designed to determine that energy signals 202 being generated by auricular acupuncture device 100 are of the proper frequency, power, duration, and at the proper locations for an appropriate treatment protocol. As shown in FIG. 7, test fixture system 530 also includes an adapter for ear retention device 716 that helps in connecting the test fixture system 530 to the ear retention device. Test fixture system 530 also suitably includes first 718 and second 720 connectors for connecting the various elements and components. Test fixture system 530 is typically connected to auricular acupuncture device 100 before or after a treatment session to confirm that the device is correctly calibrated and functioned appropriately.

Test fixture system 530 can perform tests on the microprocessor of device control module 106, including during initial start up and after each treatment cycle. Test fixture system 530 is suitably utilized prior to a first use of the device, even prior to deployment, and can be used periodically to trouble shoot or for quality control during use on patients. Test fixture system 530 can perform following tests: memory checksum for both the ROM and RAM, simultaneously measuring the current flow thru the system using the Built in Test Resistive sensor (549) it is possible to validate that the laser diode system is connected and working. Validation of Analog to Digital conversion circuits associated with resistivity sensor 304 and temperature sensor 306. Validation of microphone 504 and speaker 502, for example by sending a tone to the speaker and, in embodiments as a result of the proximity of the speaker to the microphone, validating that both the speaker and microphone are operational. If any of test fixture system 540 test detect a failure, operation of auricular acupuncture device can be halted, and an alert (audio signal, light warning, etc.) can be sent to both the patient and clinical support staff/doctor.

Provided below is an exemplary treatment sequence logic:

1) Initiation and auricular feedback components. These components are used to provide initiation of the treatment process and feedback to the patient. These components include:
   1. Initiation Switch
   2. Built in test function
   3. Flashing LED
   4. Auricular Feedback
   5. Patient Validation
   6. Audible Speaker
   7. Microphone
   8. Auricular Acupuncture Database Engine (AADBE)

2) These components work in conjunction with the electronic interface in the following ways or similar ways to achieve a safe and effective treatment:

3) After insertion, the patient must press the initiation switch to start the test fixture system, fail safe tests, and stimulation cycle. Upon this signal the auricular acupuncture device awakes and starts the test fixture system and verifies communication to the AADBE. After successful testing, the communication to the AADBE is performed an LED and voice synthesized instruction signals the patient to start treatment by inserting the ear retention device (ERD).

4) If ERD is inserted correctly the auricular acupuncture device tests for correct skin temperature and proper skin resistance thus signaling that the unit is inserted correctly. In additional embodiments, a code word, phrase or number can be sent to the speaker which is associated with the ear retention device. The patient must then repeat this code word, phrase or number, which is validated by device control module 106, thereby confirming that the ear retention device is properly inserted within the ear of the correct patient.

5) If not inserted properly through sensing of the skin resistance and skin temperature, and potentially code, it will alert the user that insertion has not yet been sensed and it should be re-inserted or the unit should be inspected for defects.

6) An audio signal then signals the patient to repeat his/her name and date. The built in microphone and speaker performs an analysis of the patient's voice to validate that the person using the auricular acupuncture device is correct and not an imposter and is also scheduled for treatment for this day. Additional voice prompting may also be performed to determine their readiness for treatment.

7) Once inserted properly the auricular acupuncture device provides the next level of feedback and the visual indicator switches to a different flashing pattern.

8) Once validated and after a few seconds, the stimulation cycle begins. Once initiated the controller will alert the user through the audio feedback system that stimulation is now in process for the required time. To enhance the effectiveness of the treatment cycle audio tones or music therapy can also be initiated through the built in audio speaker.

9) During the stimulation cycle, an alert can be provided to the user that a defined number minutes are remaining.

10) The user has the option of stopping the stimulation cycle or pushing the initiation button. If paused or stopped an auricular feedback alert will occur thru numerous ways including but limited to the audio feedback system and the visual feedback system.

11) In the event that the patient removed the device or the built in test system indicates that the auricular acupuncture device is not properly inserted, the cycle will immediately stop and the laser radiation and or electrical stimulation will be disabled immediately thus preventing exposure to either electrical signals or un un-intended laser radiation. A new cycle may begin again within the same day or cycle if appropriate.

12) Similarly, if the user removes the auricular acupuncture device or movement causes the skin resistance sensors to loose contact, the stimulation will stop. An audio feedback alert will be provided indicating that the unit has been removed or has lost connection. Any loss of connection immediately turns off the laser diode system to prevent the possibility that the patient may be exposed to the laser radiation and electricity.

13) At the end of the stimulation cycle, the laser and or electrical stimulation are disabled and the user will be alerted that the laser stimulation cycle has ended. At this time the patient will be prompted thru the speaker to provide feedback on the treatment either based on the current cycle or the effects of the past cycles on their response. These responses will be recorded digitally within the Microprocessor for system for transmission to the AADBE for recording and analysis 14) The AADBE may analyze these responses and potentially prompt the patient for additional information or prompt the patient to end the treatment cycle and remind the patient of the time and date for the next treatment cycle. Other prompts may also be required to recharge the battery system and or re-test the unit with the associated test fixture system. Further prompts may also be performed based on the results of the analysis of the prompts and future analysis that may be potentially identified after the automatic analysis or a system such as AI system has performed treatment on numerous other patients over time.

15) All events relating to its use are automatically recorded within the microprocessor memory database for later transmission to the AADBE.

In further embodiments, provided herein are methods of treating a medical condition or a presenting symptom in a patient (also called methods of treatment or treatment protocols herein). As used herein, a "medical condition" includes a disease, illness, disability, injury or disorder, as well as associated symptoms, that is diagnosed or confirmed by a medical professional (i.e., doctor). A "presenting symptom" includes various systemic effects or phenomena, e.g., fever, headache, body pain, nausea, anxiety, fatigue, or other mental or physical experiences, which may or may not be accompanied by a diagnosis or confirmation of a medical condition from a medical professional.

The methods of treatment suitably include engaging auricular surface 408 of patient's ear 410 with auricular acupuncture device 100. As described herein, a suitable auricular acupuncture device 100 includes ear retention device 102 conformable to auricular surface 408 of patient's ear 410, ear retention device 100 including a plurality of energy output sites 302 corresponding to auricular acupuncture points of the patient's ear. As described herein, in embodiments, energy output sites 302 substantially contact auricular surface 408 of the patient's ear 410. Auricular acupuncture device 100 also includes energy interface module 104, including at least an optical energy source or an electrical energy source, optically or electrically coupled to ear retention device 102. Auricular acupuncture device 100 also suitably includes device control module 106, electrically coupled to energy interface module 104, as well as support structure 108 for maintaining ear retention device 102 adjacent auricular surface 408 of patient's ear 410. Suitably, auricular acupuncture device 100 also includes compliance detection element 308 for determining that auricular acupuncture device 100 is correctly engaged. Compliance detection element 308 can be associated with ear retention device 102 or support structure 108.

The methods of treatment further include initiating an optical energy signal or an electrical signal from energy interface module 104. As described herein, in embodiments, the optical energy signal is a laser signal, suitably having a power output of about 10 mW to about 50 mW and a wavelength of about 610 nm to about 685 nm. Additional power ranges and wavelengths that can be initiated, i.e., emitted from energy interface module 104, are described herein. Suitable electrical energy signals include current levels of about 0.1 mA to about 5 mA (constant, direct current), at a monophasic frequency (e.g., about 0.5 to about 2 Hz, suitably about 1 Hz).

The optical energy signal or the electrical energy signal is then passed through ear retention device 102, suitably exiting at energy output site(s) 302, and delivered to auricular acupuncture points on auricular surface 408 of the patient's ear 410. As described herein, the optical energy signal or the electrical energy signal are suitably delivered in sufficient levels to penetrate tissue of the patient's ear and stimulate the auricular acupuncture points.

In further embodiments, the methods of treatment further include receiving a response from the patient regarding the treatment. This response suitably is from compliance detection element(s) 308, and can include an auditory response from microphone 504. In further embodiments, a response from compliance detection element 308 can include temperature information from temperature sensor 306 and/or resistivity information from resistivity sensor 304.

In still further embodiments, the methods of treatment suitably include providing feedback to the patient via remote database system 540. As described herein, in embodiments, remote database system 540 is suitably wirelessly coupled to auricular acupuncture device 100. Feedback that is provided to the patient can include various information or instructions, such as auditory commands via speaker 502, suitably associated with support structure 108 or ear retention device 102. Additional feedback can include visual commands, for example a light or light emitting diode associated with support structure 108, and/or haptic commands via one or more haptic actuators associated with ear retention device 102 and/or support structure 108.

This feedback process (interaction between patient and remote database system 540) can utilize various artificial intelligence systems to allow for real-time analysis and interactions with the patient. Such feedback can include querying the patient regarding the perceived response to a treatment protocol, both currently being conducted, or in the past, as well as validating that the appropriate acupuncture points are being targeted and stimulated. Responses can be digitized and transmitted (in compliant and adherence with HIPPA (Health Insurance Portability and Accountability Act of 1996) guidelines) to either remote data base system 540 (which can be at the location of the patient, i.e., doctor's office, or in a central location if a patient is at home) and automatic analyses software such as an Artificial Intelligence system (AI) can be used for analysis and storage and or further queries. This recording technology allows remote clinicians and compliance officers to participate in the patient's response to self-administered treatments that and can be remotely validated through an associated communication compliance system, which includes compliance detection element(s) 308. Anomalies which are outside the bounds of expectations can forwarded to a case manager for further analysis and personal discussion with the patient, and can allow for recommendations or modifications to treatment protocols or modalities.

The methods of treatment described herein can be used to target any auricular acupuncture point known in the art, and suitably include at least one of, at least two or, or all three of, the auricular acupuncture points of Shenmen (see, e.g., Shu-Ming et al., "Auricular Acupuncture: A Potential Treatment for Anxiety," *Anesthesia & Analgesia* 92:548-553 (2001)), Yuanzhong (see, e.g., Gao et al., "Multiple central clinical studies on the needling method for regulating wei and strengthening brain for treatment of insomnia," *Chinese Acupuncture& Moxibustion* 27:623-625 (2007) and Fei, the disclosures of each of these article are incorporated by reference herein in their entireties, particularly for the location and use of the recited auricular acupuncture points.

The devices, methods and systems provided herein can be used in treating opioid addictions, Post Traumatic Stress Disorder (PTSD) and pain through regular and automatic stimulation of specific auricular acupuncture points within the ear. As described herein, the combination of ear retention device 102, energy interface module 104 and device control module 106 of auricular acupuncture device 100, provides stimulation, fail safe features, self-test features, including speaker 502 for prompting the patient, microphone 504 for recording the patient's responses and supporting software (in remoted database system 540) or via other automatic system using a direct, wireless or radio communication system.

The various methods and devices described herein allow for advanced health assessment both physically and emotionally through the use of interfaces to wearable technologies (e.g., sensors 140) which can measure key health indicators. These can include low cost, accurate and wearable sensors such as watch or strap-based sensors, and which can communicate through local area networks to the auricular acupuncture devices described herein. Additionally, the built in microphone and speaker allow two way communication through a local area network and further communication to a machine learning computer system which can incorporate the ability to:

- Perform voice validation of the patient or patient's relative.
- Query the patient with relevant addiction, PTSD and pain related questions.
- Measure and record relevant health indicators, such as heart rate, galvanic skin response and other indicators relevant to addiction, PTSD and pain.
- Upon analysis of initial responses and relevant health indicators, a machine learning program can invoke a remote physiotherapy/psychotherapy session using process, machine learning techniques learned from other systems to further assist the patient understand and supplement their treatment recovery process. Results of these responses and, health indicators of the patient's response, can be available in the database for future review and analysis by the patient's case manager or other treatment professionals.

In further embodiments, provided herein are various methods of making ear retention device 102 for use in auricular acupuncture device 100, illustrated schematically in FIGS. 6A-6C. In one embodiment, in FIG. 6A, a molding fabrication method 600 is provided, which includes inserting a plastic molding compound 602 against auricular surface 408 of a mammalian ear 410. Plastic molding compound 602 is allowed to dry or cure, and set, which forms a molded auricular structure 606. Molded auricular structure 606 is removed from auricular surface 408, and a plurality of energy output sites 302 are created in molded auricular structure 606. As described herein, these energy output sites correspond to auricular acupuncture points of the mammalian ear 410. Methods for creating energy output sites 302 suitably include cutting out or drilling holes in molded auricular structure 606, or in other embodiments, elements can be placed into plastic molding compound 602, prior to drying, and then removed after drying, thereby leaving voids in the material where desired. In other embodiments, two (or more) different molding compounds can be used, so that areas where energy output sites 302 are desired are made from translucent or transparent plastics, whereas other portions are suitably made from opaque materials (e.g., plastics or rubbers).

In suitable embodiments, fabrication method 600 further includes inserting one or more energy conductive path elements (e.g., a laser diode, a fiber optic cable, a prism, lens, etc.) into the molded auricular structure to create the ear retention device 102, suitably at energy output sites 302. In further embodiments, temperature sensor 306, resistivity sensor 304, and/or speaker 502, can be inserted, attached, or otherwise associated, with the molded auricular structure to generate ear retention device 102, as can other elements, such as electrical connections, connection ports for use with test fixture system 530, etc.

FIG. 6B illustrates a further method of making ear retention device 100, in accordance with embodiments hereof. In photography fabrication method 610, a two dimensional photograph is obtained 612 of auricular surface 408 of a mammalian ear 410. In step 614, points corresponding to auricular acupuncture points of the mammalian ear are identified on the two-dimensional photograph. The two-dimensional photograph is processed in step 616, along with known dimensions of the mammalian ear, to create a three-dimensional plan for ear retention device 102. This three-dimension plan includes a plurality of energy output sites 302 at the points corresponding to auricular acupuncture points of the mammalian ear 410. In step 618, an auricular model is printed using a three-dimensional printer. As discussed above, one or more energy conductive path elements can then be inserted into the auricular model to create ear retention device 102, suitably at the energy output sites. One or more of temperature sensor 306 resistivity sensor 304, and/or speaker 502 can also be inserted into the auricular model, as can other elements, such as electrical connections, connection ports for use with test fixture system 530, etc. In embodiments, the three-dimensional printing can include printing transparent or translucent material at the energy output sites (i.e., a material which has minimum attenuation to the specific laser energy wavelengths utilized), with the remainder of the auricular model being printed from an opaque material.

FIG. 6C shows an additional method of making ear retention device 100. In three-dimensional scanning fabrication method 620, a three-dimensional scan is obtained 622 of auricular surface 408 of a mammalian ear 410. In step 614, points corresponding to auricular acupuncture points of the mammalian ear are identified on the three-dimensional scan. The three-dimensional scan is processed in step 616, along with known dimensions of the mammalian ear, to create a three-dimensional plan for ear retention device 102. This three-dimension plan includes a plurality of energy output sites 302 at the points corresponding to auricular acupuncture points of the mammalian ear 410. In step 618, an auricular model is printed using a three-dimensional printer. As discussed above, one or more energy conductive path elements can then be inserted into the auricular model to create ear retention device 102, suitably at the energy output sites. One or more of temperature sensor 306, resistivity sensor 304, and/or speaker 502 can also be inserted into the auricular model, as can other elements, such as electrical connections, connection ports for use with test fixture system 530, etc. In embodiments, the three-dimensional printing can include printing transparent or translucent material at the energy output sites, with the remainder of the auricular model being printed from an opaque material.

Figure 8:
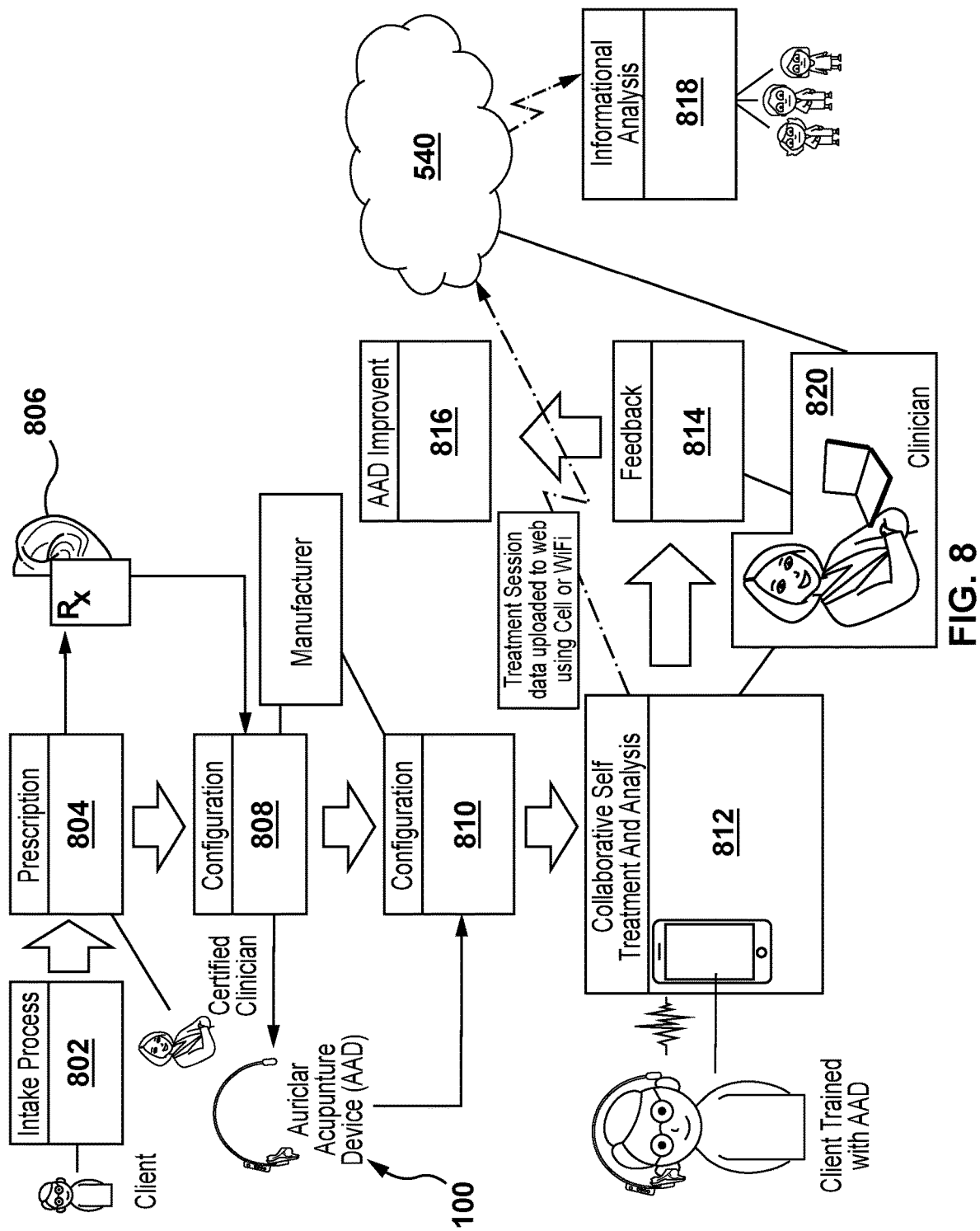
FIG. 8 shows a flowchart of a process flow for device preparation, fabrication, configuration and use, of an auricular acupuncture device, in accordance with embodiments hereof.

In further embodiments, provided herein are various methods of carrying out preparation of a device or system as described herein, along with preparing the device or system, and then conducting various methods of treatment or treatment protocols. For example, FIG. 8 shows a flowchart of a process flow 800 for device preparation, fabrication, configuration and use. In embodiments, in step 802, a patient (client) provides various information in an intake process, such as a meeting with a doctor or other certified professional. Intake process 802 includes obtaining personal patient information and background, presenting symptoms or medical conditions, etc. In step 804, a prescription is prepared, requesting the preparation of an auricular acupuncture device, as described herein. In step 806, information regarding the auricular surface 408 of the patient's ear is obtained, including for example taking a mold, a two-dimensional photograph, and/or a three-dimensional scan, as described herein. In step 808, ear retention device 102 is fabricated (see FIGS. 6A-6C, and description herein) and the other components are assembled to produce auricular acupuncture device 100. In step 810, configuration of auricular acupuncture device 100 takes place, which includes interplay between clinician, patient and fabricator, to appropriately test, calibrate and fit auricular acupuncture device 100 for the specific patient. Auricular acupuncture device 100 is then ready for use in treatment protocols and methods of treatment in step 812. Treatment step 812 can include use of remote mobile devices (i.e., phone, tablet) for collaboration with clinician in the form of clinical monitoring 820 to respond to patient requests and feedback from the device. Methods and protocols for treatment are described herein. Treatment step 812 can also include various forms of artificial intelligence, or other intelligence software, to provide real-time feedback and guidance. This interaction with a clinician, in the form of clinical monitoring 820, suitably also includes feedback from compliance detection elements 308, which can include temperature or resistivity measurements, verbal feedback from the patient via microphone 504, etc. Suitably, this interaction, including clinical monitoring 820, is facilitated by wireless (or hard-wired) interactions between auricular acupuncture device 100 and/or remote database system 540, which can be a cloud computing-based system. Remote database system 540 can also be utilized by various groups, including research teams, police departments, case managers, hospitals, research groups, etc. for informational analysis 818 to analyze treatment protocols, patient compliance, etc., to improve treatments and device designs. Informational analysis 818 can also be conducted by doctors to analyze multiple patient's responses and provide feedback, analysis and updates to treatment protocols, etc.

In step 814 of feedback can be provided from the clinician conducting clinical monitoring 820 to the auricular acupuncture device manufacturer, including requirements for modifications to the device, treatment protocol, software interactions, etc., which can be utilized to improve auricular acupuncture device, etc., in step 816.

Interactions between system 500 and clinician conducting clinical monitoring 820 and/or groups conducting information analysis 818, are illustrated schematically in FIG. 5, where monitoring of various components of the system 500, including remote database 540, can occur.

An additional method for preparing an auricular acupuncture device 100 as described herein is illustrated in FIGS. 9A-9D, and includes the use of digital light processing (DLP) technology as the mechanism for directing laser energy to a plurality of energy output sites corresponding to auricular acupuncture points of the mammalian ear. DLP relates to a set of chipsets based on optical micro-electro-mechanical technology that uses a digital micromirror device. Microscopically small mirrors laid out in a matrix on a semiconductor chip, known as a Digital Micromirror Device (DMD), allow for control of the placement and precise location of reflected laser energy. The mirrors can be repositioned rapidly to reflect laser light. Using an advanced and custom DLP chip a single or multiple laser energy source can be directed to a DLP or multiple DLP chip system that under software control directs the laser energy to multiple auricular acupuncture points selected by the practitioner or automatically selected.

The DLP methods involve the use of a custom DLP chip in which laser light is directed as either a single beam or multiple beams. Under software control and by utilizing pre-selected ear locations that are calibrated to the unique person's ear, the DLP chip shifts its internal mirrors under software control to direct reflected laser beams to the specified points for the required period of time and at the necessary energy levels to ensure skin penetration and stimulation of the required acupuncture points.

Figure 9A:
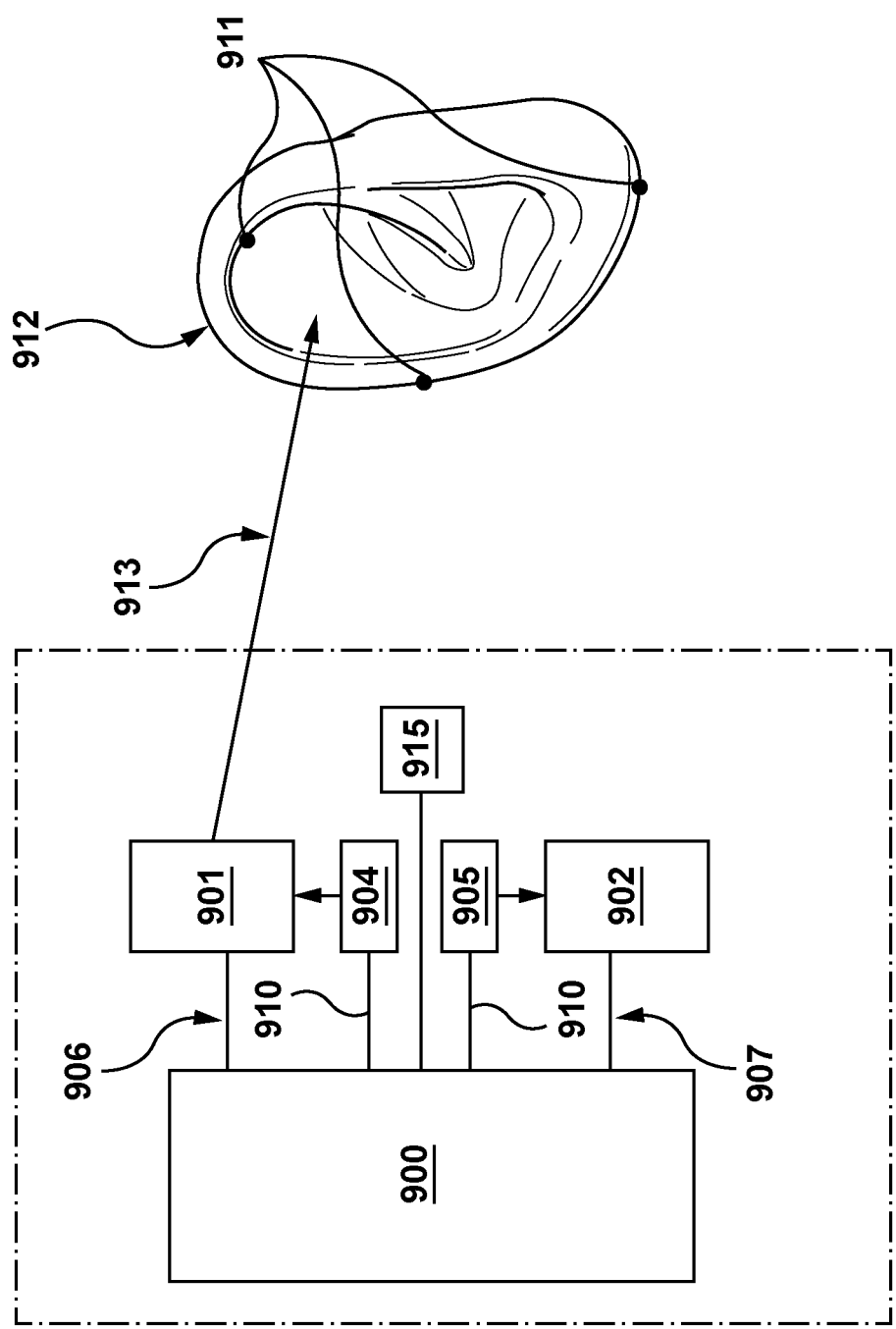
FIGS. 9A-9D show the use of DLP in an auricular acupuncture device, in accordance with embodiments hereof.

FIG. 9A depicts an arrangement with two DLP chips (901 and 902) that allow positioning from different angles in the patient's ear where it may not be possible to use one DLP chip. The methods and devices described herein can also be utilized with a single DLP chip. As shown schematically in FIG. 9A, image processor 900 controls laser array 1 (904) and laser array 2 (905) to provide laser light to DLP1 (901) and DLP2 (902) through controls 906 and 907 respectively. Laser light from the DLPs are directed to an auricular acupuncture site, i.e., energy output site 302, along direction 913. FIG. 9A also shows the use of a laser light sensor 915, as well as ear contours 912 for registration and permanent reflective alignment points 911. Laser Light Sensor 915 is used to detect the event when the DLP chip mirrors are positioned to focus on the reflective points 911, 912, or 913.

The following describes an exemplary process for preparing an auricular acupuncture device utilizing DLP:
Induction Process:
  Insert permanent reflective points at three locations within patient's ear at approximately 120° intervals
  Take two photographs of patient's ear
  Transfer patient ear photograph showing reflective points to Ear Point Translation Software Program. These processes are suitably performed within the clinician's induction process software on a dedicated PC or similar computer systems.
  Photograph of patient's ear is characterized; identifying desired acupuncture points which will be stimulated using laser energy
  Customized software translates specific acupuncture points to x/y coordinates relative to the three reflective points identified in the photograph
  Acupuncture point matrix locations are transferred to ear retention device video processor system to enable to further identification of acupuncture points
Acupuncture Point Location Translation:
  Patient attaches ear retention device/auricular acupuncture device system in preparation for treatment
  Patient initiates treatment process which initiations DLP location translation software
  DLP translation software enables laser illumination of DLP chip. DLP translation software begins iteration of mirror movement in an x/y direction for required amount of time for each ear location while simultaneously monitoring a reflective image of the three reflective points. Upon receipt of a reflective image, the software identifies the specific mirror x/y location(s) used to locate the first of three reflective points. This process is repeated for each new application of the ear retention device.

DLP translation software continues iteration of mirror locations until the second and third reflective points are identified Upon successful identification of mirror locations associated with each reflective point, the DLP translation software translates the reflective point locations and the desired acupuncture points into DLP mirror locations associated with the selected acupuncture points DLP Activated Treatment Process:

Upon identification of acupuncture point locations based on DLP mirror locations, the treatment algorithm begins For each acupuncture point, the DLP mirrors are focused on the required mirror location for a period of time consistent with the DLP chip temperature and operational limits and acupuncture point energy requirements necessary to achieve adequate stimulation Based on each acupuncture point exposure, additional iterations are formed for each point until the required energy level is achieved at each point Image processor 900 refers to a custom image processor or a sub-processor function within microprocessor 508 from FIG. 5. The image processor function 900 performs the scanning of the ear through the positioning of the mirrors, and also translates data as described above, which describes the software functions necessary to translate the acupuncture positioning from the patient ear. Image processor 900 receives input through the communication system to load the data from the translation software function described above. Image processor 900 also receives input from Laser Light sensor 915. Laser light sensor 915 is activated by a software function during the iterative process of scanning the mirrors until the laser light is focused on the different reflective point embedded in the ear (described above). This data is used to correlate the dimension of the ear to DLP chip mirror locations. Image processor 900 also outputs signals to the DLP chip(s) 901 and 902 to position the mirrors as required and based on the locations identified by software functions described above. Image processor 900 also outputs signals to the laser arrays to enable the correct laser signals when required.

Devices 901 and 902 represent the DLP Chip Devices which position the mirrors on command from the video processor function included to reflect laser light from one of the laser arrays 904 and 905 shown in FIG. 9A.

Figure 9C:
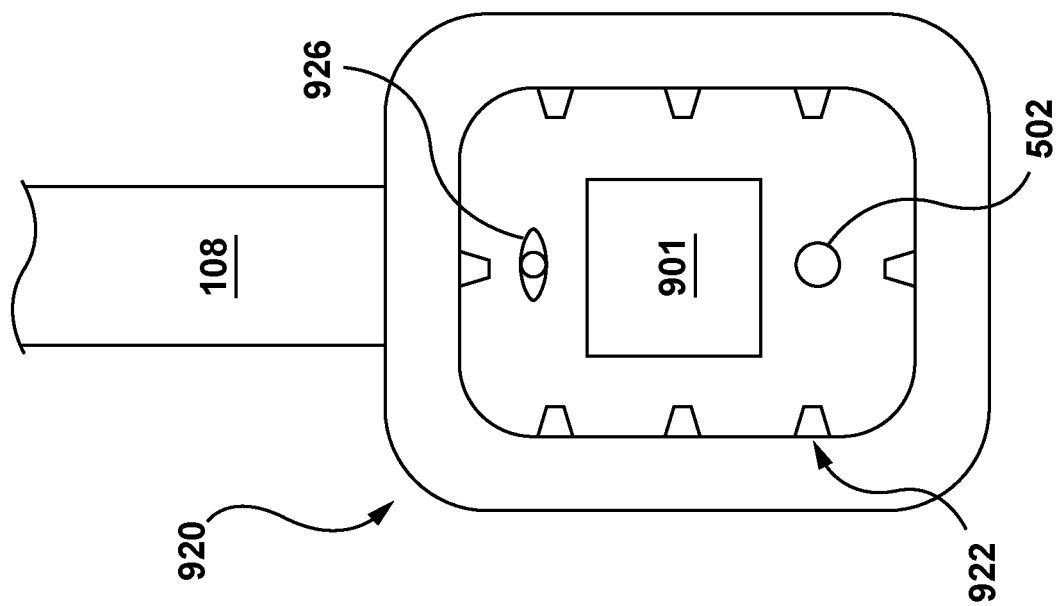
Figure 9B:
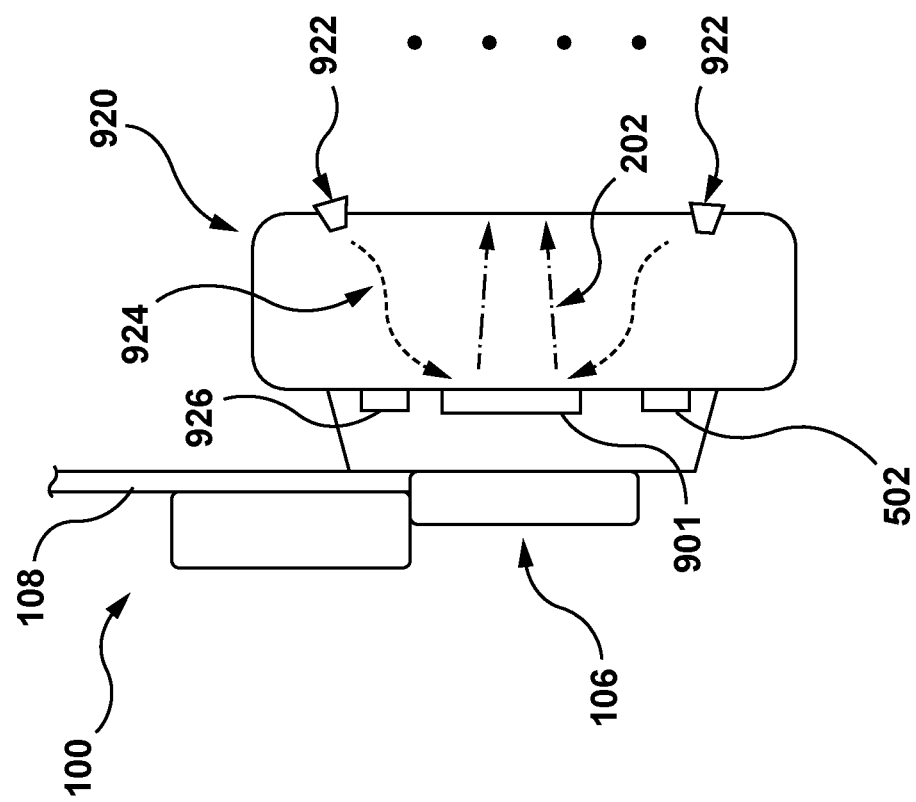
Figure 9D:
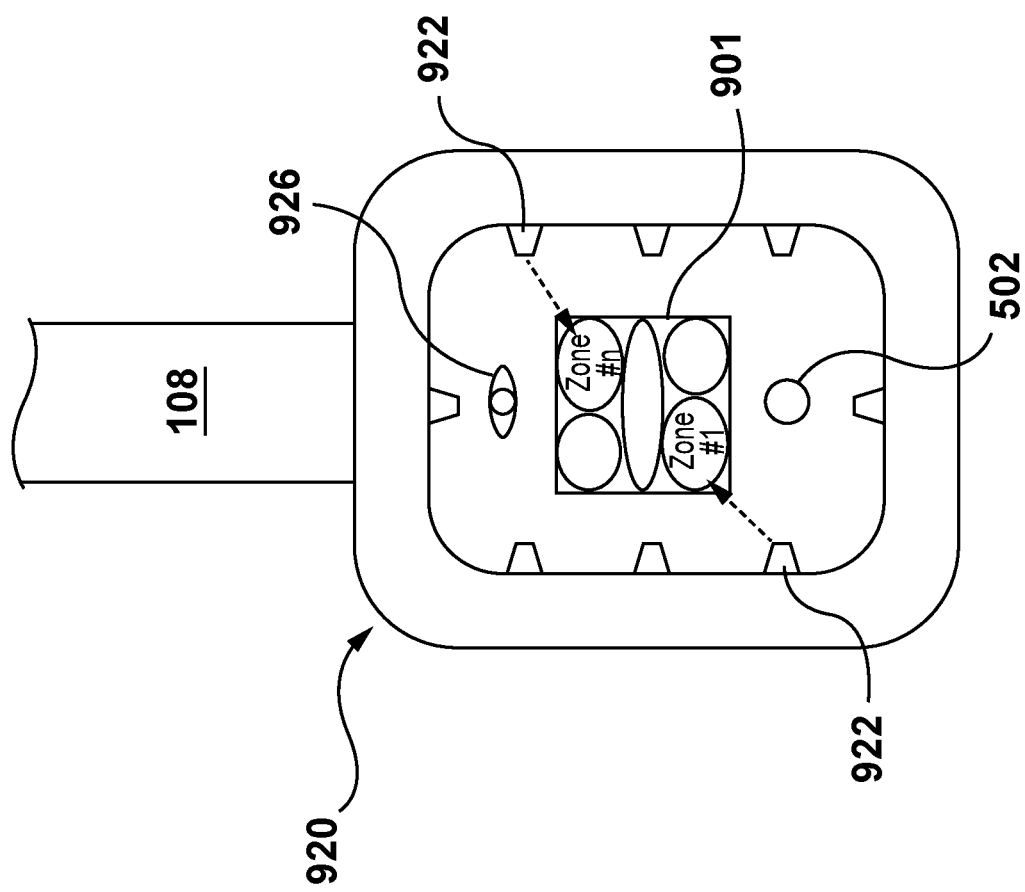

FIG. 9B shows a side view of an auricular acupuncture device 100 prepared using a DLP, and 9C a front view. Device 100 suitably includes a housing 920, for example a headphone type housing, and includes a plurality (i.e., 2 or more, suitably 2-20, of lasers 922 (including 1 to n lasers). Also shown is a DLP chip 901 (though can be a plurality of DLP chips, including 1 to n chips). The device includes device control module 106 for controlling the auricular acupuncture device. As indicated, lasers 922 provide energy 924 (laser light) which reflects off of DLP chips (mirrors) and toward the patient's ear and auricular surface 408 via energy output sites 302 as energy signal 202. A camera 926 is suitably provided to confirm that the energy is provide as desired, and an exemplary location for speaker 502, is also shown, as is an exemplary support structure 108 (e.g., a headband or similar). FIG. 9C shows areas of DLP chip where different zones of the mirrors cover different areas of the auricular surface. Drawings are not provided to scale.

Figure 10A:
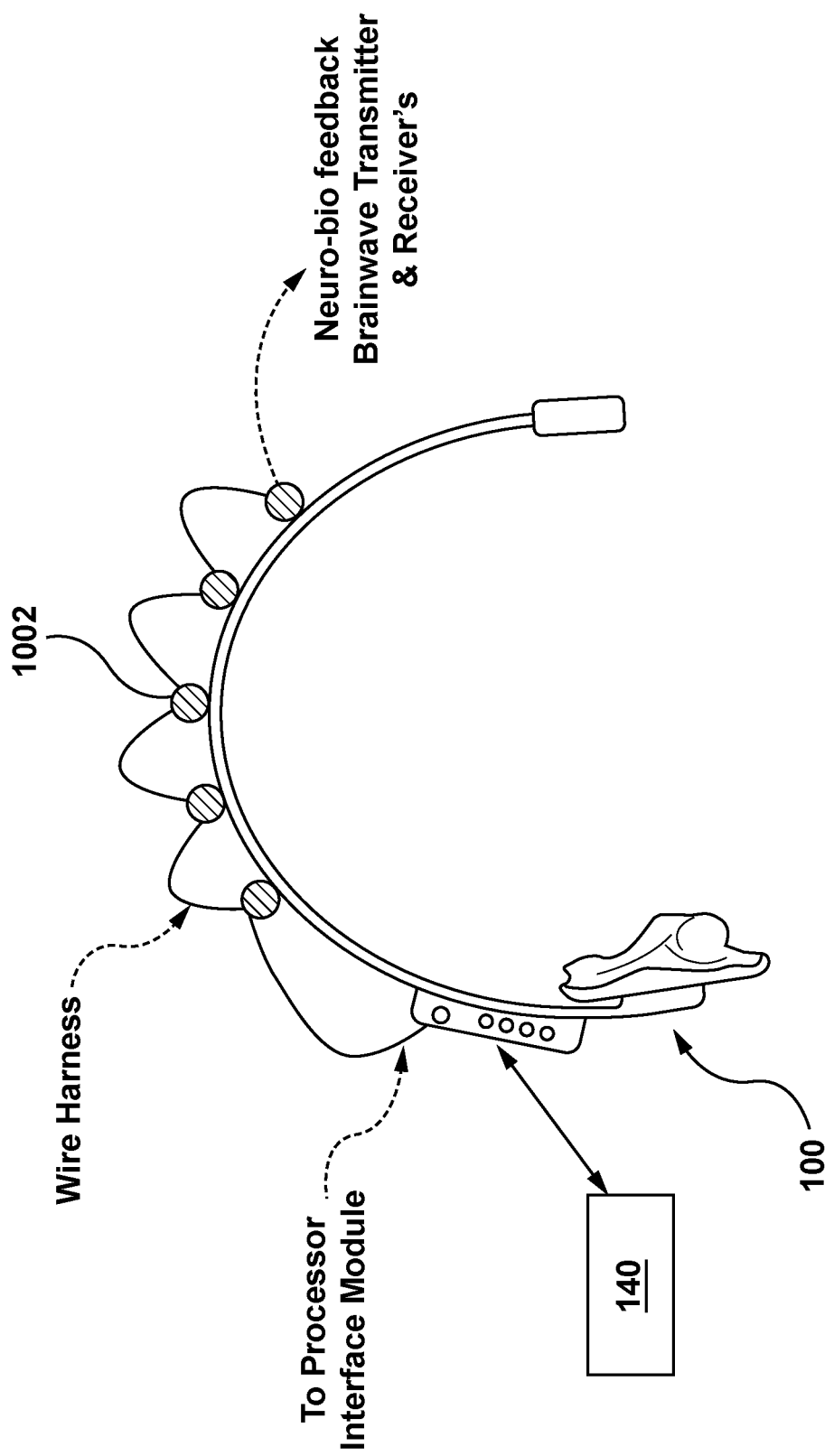
FIGS. 10A-10C show the interface between an auricular acupuncture device and various sensors, as described herein.
Figure 10B:
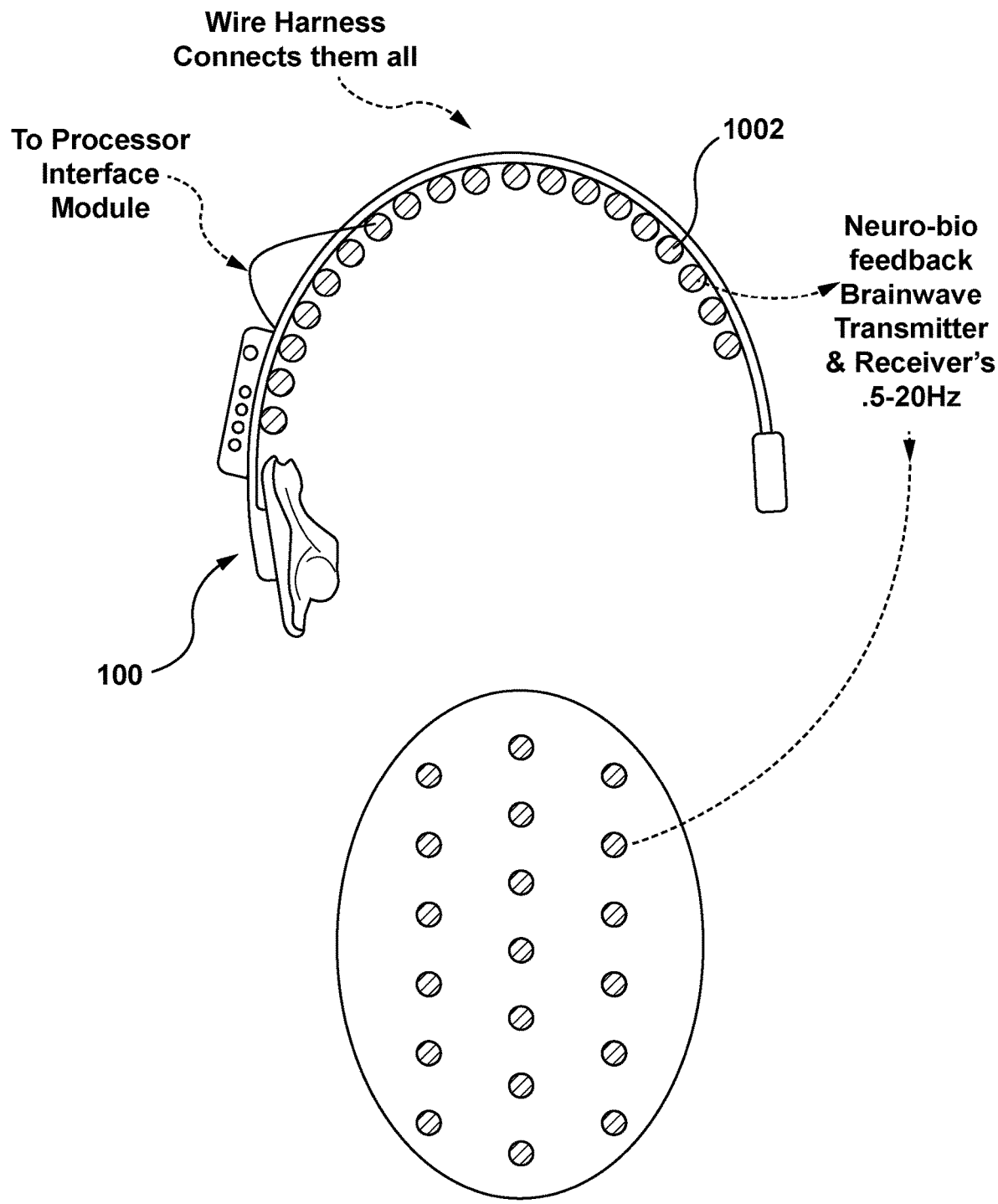
Figure 10C:
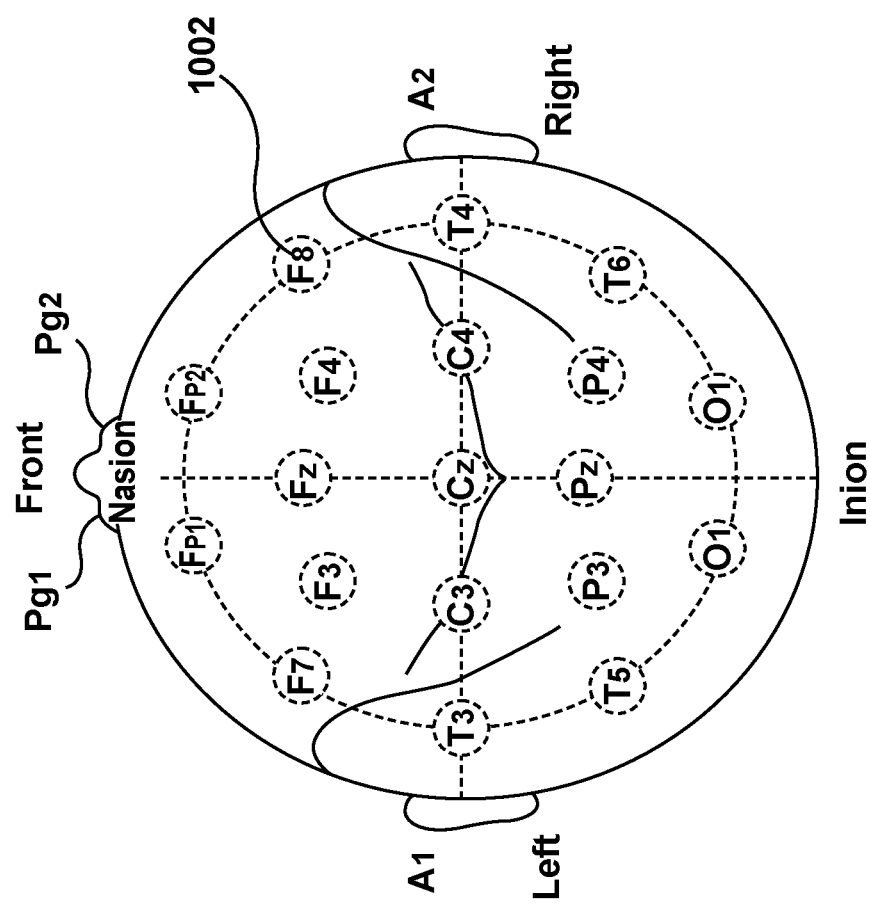

FIGS. 10A-10C show the interface between auricular acupuncture devices 100 as described herein, with various sensors 140. As described herein, sensors 140 can include various wearable sensors, including heart rate and temperature monitors, as well as neuro-bio feedback brainwave transmitters and receivers 1002 as shown in FIG. 10A. FIG. 10B shows another configuration of neuro-bio feedback brainwave transmitters and receivers 1002. In such embodiments, neuro-bio feedback brainwave transmitters and receivers 1002 can cover the head of a patient in the form of a cap or similar, allowing for access to each of the areas for neuromodulation. FIG. 10C shows exemplary locations (19 areas for neuromodulation) for neuro-bio feedback brainwave transmitters and receivers 1002 on the head of a patient.

Figure 11:
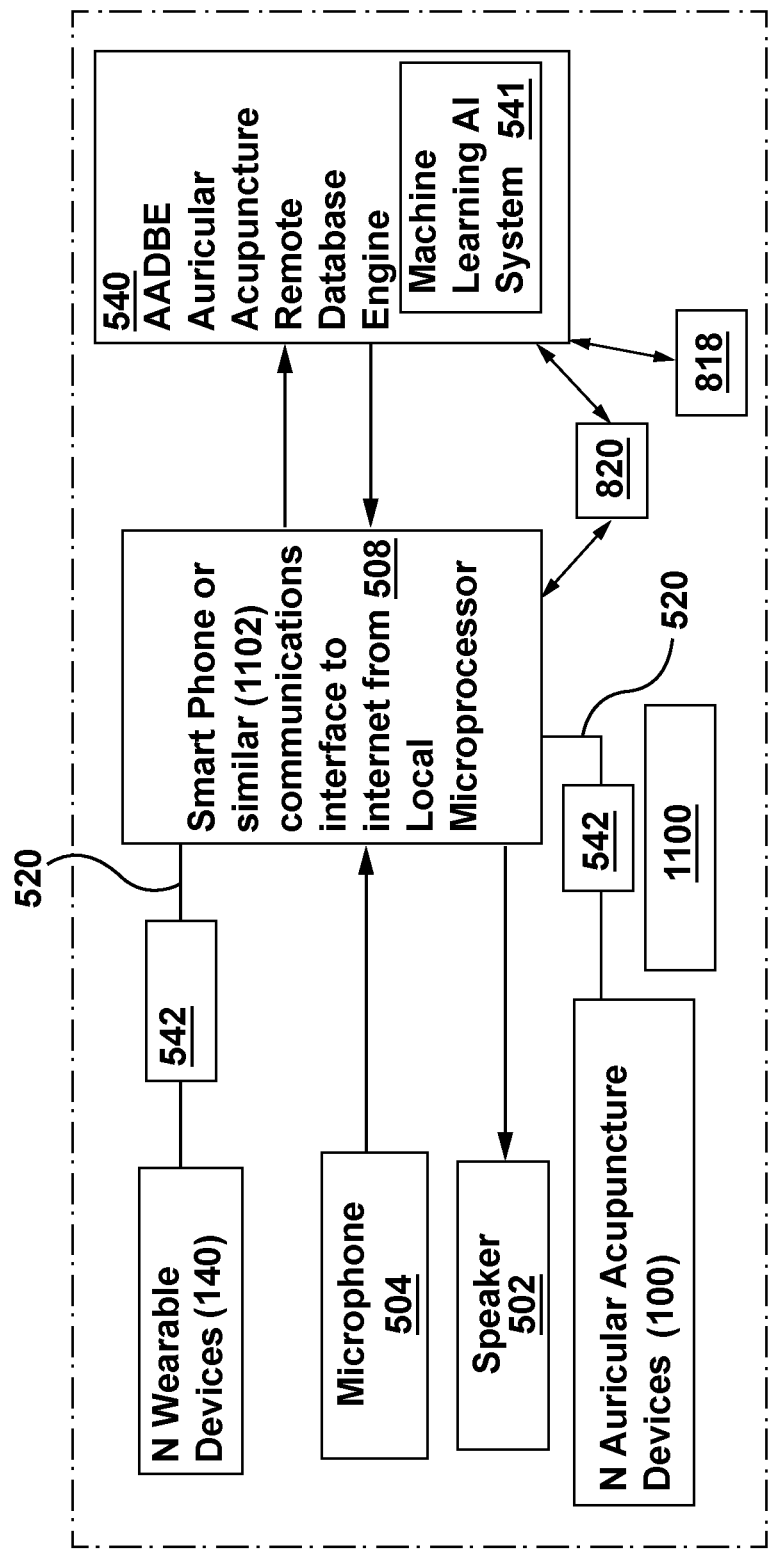
FIG. 11 shows an overall whole health monitoring approach utilizing auricular acupuncture devices, as described herein.

FIG. 11 shows an overall whole health monitoring approach utilizing auricular acupuncture devices, as described herein. As described herein, various auricular acupuncture devices 100, in concert with sensors 140, including wearable sensors such as Heart Rate and Neural feedback and other future sensors (e.g., N sensors and N devices), suitably communicate (from microprocessor 508), either via a direct connection 520 and/or a wireless connection 542, to a communication interface 1102, which can be a smart phone, tablet, computer, or similar device. Suitably, a remote database 540, which can include a machine learning system 541, is also integrated in the overall system 1100. In addition, verbal feedback through the microphone, 504, and speaker, 502 provide additional capacity for Whole Health Biofeedback and Treatment by integrating data from wearable sensors and/or a patient's verbal responses to queries developed by the by remote machine learning systems. Based on this information the energy that is provided to the auricular acupuncture surface can be changed to improve the patient's outcome. This capability aides in the refinement and continued development of the treatment plan along with physiological counseling. Remote database system 540 (and machine learning 541) can also be utilized by various groups, including research teams, police departments, case managers, hospitals, research groups, etc. for informational analysis 818 to analyze treatment protocols, patient compliance, etc., to improve treatments and device designs. Informational analysis 818 can also be conducted by doctors or case managers to analyze multiple patient's responses and provide feedback, analysis and updates to treatment protocols, etc. As described herein, clinical monitoring 820 can also be conducted by interacting with auricular acupuncture device 100, suitably via microprocessor 508 and/or database 540, to review patient progress and conditions, as well as to modulate or update the system 500 and methods as needed.

The systems described herein maintain an array of sensors to allow both the patient/client and clinician to adjust treatment on a case by case basis, moment by moment and allows for future treatment planning. The ability to send and receive patient data is valuable for treatment, and allows authorities to use both within the field and outside. Insurance companies, large medical centers, to local health care management companies can all benefit from the data obtained via the systems. The ability for the clinician to respond to subtle changes in client's voice recognition, heart rate, blood pressure, perspiration, galvanic skin response and a neuro bio-feedback data sensors integrated with the auricular acupuncture devices has the ability to measure neuro frequencies and have a closed loop system. The addition of virtual reality display capability can enhance the clinical capability for future treatment in the field and at home with personalized care for such conditions as eye movement desensitization and reprocessing (EMDR) therapy, relaxation response and sleep conditions.

The systems can also include a patient data axillary port connection that is a bi-directional, an axillary data port for internet of things (IoT) devices such as sensors to measure real-time physical and physiological data from the patient. This data can be used in combination with AI to have a closed loop system of treatment for the patient. This port is an extension of the microprocessor unit and can provide feedback to the cloud for further processing or storage via wireless which is built into the headset. Over time, and the patient's data can be aggregated and AI training used to infer how to adjust the treatment. (Artificial Intelligence has a training and inference component of processing.)

It is to be understood that while certain embodiments have been illustrated and described herein, the claims are not to be limited to the specific forms or arrangement of parts described and shown. In the specification, there have been disclosed illustrative embodiments and, although specific terms are employed, they are used in a generic and descriptive sense only and not for purposes of limitation. Modifications and variations of the embodiments are possible in light of the above teachings. It is therefore to be understood that the embodiments may be practiced otherwise than as specifically described.

While various embodiments have been described above, it should be understood that they have been presented only as illustrations and examples of the present technology, and not by way of limitation. It will be apparent to persons skilled in the relevant art that various changes in form and detail can be made therein without departing from the spirit and scope of the present technology. Thus, the breadth and scope of the present technology should not be limited by any of the above-described embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A method of treating a medical condition or a presenting symptom in a patient, comprising:
    creating an ear retention device via:
    a. inserting a molding compound against an auricular surface of the patient's ear, wherein the auricular surface is an inner surface of the patient's ear facing away from the patient's head, to form a molded auricular structure, and creating a plurality of energy output sites in the molded auricular structure to create the ear retention device;
    b. engaging the auricular surface of the patient's ear with an auricular acupuncture device, including:
        i. the ear retention device that conforms with the physical anatomy and scale of the auricular surface of the patient's ear and directly abuts against the auricular surface of the patient's ear, the ear retention device including the plurality of energy output sites corresponding to a plurality of auricular acupuncture points of the patient's ear, wherein the energy output sites substantially contact, within about a 2 mm distance to, the auricular surface of the patient's ear;
        ii. an energy interface module, including at least an optical energy source optically coupled to the ear retention device and an electrical energy source electrically coupled to the ear retention device;
        iii. a device control module, electrically coupled to the energy interface module;
        iv. a support structure for maintaining the ear retention device adjacent the auricular surface of the patient's ear and the energy output sites substantially contacting, within about the 2 mm distance to, the auricular surface of the patient's ear; and
        v. a compliance detection element for determining that the auricular acupuncture device is correctly engaged, associated with the ear retention device or the support structure,
    c. initiating an optical energy signal or an electrical energy signal from the energy interface module; and
    d. passing the optical energy signal or the electrical energy signal through the ear retention device through the 2 mm distance to the auricular acupuncture points on the auricular surface of the patient's ear in sufficient levels to penetrate tissue of the patient's ear and directly stimulate or impact the auricular acupuncture points.

2. The method of claim 1, wherein the optical energy signal is a laser signal having a power output of about 10 mW to about 50 mW and a wavelength of about 610 nm to about 685 nm.

3. The method of claim 1, wherein the electrical energy signal has a current level of about 0.1 mA to about 5 mA.

4. The method of claim 1, further comprising: receiving a response from the patient regarding the treatment, from the compliance detection element.

5. The method of claim 4, wherein the response is an auditory response from a microphone.

6. The method of claim 1, further comprising: receiving a response from the compliance detection element.

7. The method of claim 6, wherein the response is temperature information and/or resistivity information.

8. The method of claim 1, further comprising:
    providing feedback to the patient via a remote database system wirelessly coupled to the auricular acupuncture device,
    wherein the feedback includes: auditory commands via a speaker associated with the support structure, visual commands via a light or light emitting diode associated with the support structure, and/or haptic commands via one or more haptic actuators associated with the ear retention device or the support structure.

9. The method of claim 1, wherein the auricular acupuncture points include at least the auricular acupuncture points of Shenmen, Yuanzhong and Fei.

10. The method of claim 1, further comprising: receiving data from one or more sensors regarding the patient.

11. The method of claim 10, wherein the data is received from a wearable sensor.

12. The method of claim 11, wherein the data is received from one or more of heart rate sensors, body temperature sensors, heart EKG sensors and brain wave sensors.

13. The method of claim 1, wherein digital light processing (DLP) technology directs laser energy to the plurality of energy output sites corresponding to auricular acupuncture points of the patient's ear.

14. The method of claim 1, further comprising integrating data from wearable sensors and/or a patient's verbal responses to queries developed by a remote machine learning system to modify the passing in (d).

15. The method of claim 1, wherein the medical condition or the presenting symptom is addiction, post traumatic stress disorder (PTSD) and/or pain.

16. The method of claim 1, wherein the inserting the molding compound further comprises drying or curing and setting the molding compound.

17. The method of claim 1, wherein the creating the plurality of energy output sites further comprises cutting out or drilling holes in the molded auricular structure.

* * * * *